United States Patent
Miller et al.

(10) Patent No.: US 12,073,379 B2
(45) Date of Patent: *Aug. 27, 2024

(54) SYSTEMS AND METHODS FOR PROVIDING A TRANSACTION CARD PACKAGE ASSEMBLY INCLUDING SAMPLE PRODUCT OR SERVICE

(71) Applicant: Blackhawk Network, Inc., Pleasanton, CA (US)

(72) Inventors: Amie Miller, Livermore, CA (US); Saverio Spagnolie, Littleton, CO (US)

(73) Assignee: Blackhawk Network, Inc., Pleasanton, CA (US)

(*) Notice: Subject to any disclaimer, the term of this patent is extended or adjusted under 35 U.S.C. 154(b) by 624 days.

This patent is subject to a terminal disclaimer.

(21) Appl. No.: 15/817,546

(22) Filed: Nov. 20, 2017

(65) Prior Publication Data

US 2018/0089664 A1    Mar. 29, 2018

Related U.S. Application Data

(63) Continuation of application No. 13/440,530, filed on Apr. 5, 2012, now Pat. No. 9,852,420.

(Continued)

(51) Int. Cl.
*G06Q 20/32*    (2012.01)
*B42D 15/04*    (2006.01)
*B42D 25/20*    (2014.01)
*B65D 73/00*    (2006.01)
*G06K 19/06*    (2006.01)
(Continued)

(52) U.S. Cl.
CPC ..... *G06Q 20/3278* (2013.01); *B65D 73/0007* (2013.01); *G06K 19/06196* (2013.01); *G06K 19/083* (2013.01); *G06Q 20/20* (2013.01); *G06Q 20/202* (2013.01); *G06Q 20/28* (2013.01); *G06Q 20/322* (2013.01); *G06Q 20/347* (2013.01); *G06Q 20/354* (2013.01); *G06Q 30/0207* (2013.01); *G07F 7/10* (2013.01);
(Continued)

(58) Field of Classification Search
CPC .... G06Q 20/204; G06Q 20/20; G06Q 20/202; G06Q 20/322; G06Q 20/3278
USPC ........................................................ 705/17
See application file for complete search history.

(56) References Cited

U.S. PATENT DOCUMENTS

| 4,938,344 A | 7/1990 | McHale et al. |
| D385,488 S | 10/1997 | Smith et al. |

(Continued)

FOREIGN PATENT DOCUMENTS

WO    2012138905 A2    10/2012

OTHER PUBLICATIONS

Nixon, Hilary Kathleen. Electronic waste management in California: Consumer attitudes toward recycling, advanced recycling fees, "green" electronics, and willingness to pay for e-waste recycling. University of California, Irvine ProQuest Dissertations Publishing, 2006. (Year: 2006).*

(Continued)

*Primary Examiner* — Florian M Zeender
*Assistant Examiner* — Fawaad Haider
(74) *Attorney, Agent, or Firm* — Barnes & Thornburg LLP; Jerry C. Harris, Jr.

(57) ABSTRACT

A transaction card package assembly comprising at least one transaction card, at least one sample product, and a card holder, and methods and system for processing the same.

16 Claims, 13 Drawing Sheets

Related U.S. Application Data

(60) Provisional application No. 61/495,800, filed on Jun. 10, 2011, provisional application No. 61/473,264, filed on Apr. 8, 2011.

(51) Int. Cl.
*G06K 19/08* (2006.01)
*G06Q 20/20* (2012.01)
*G06Q 20/28* (2012.01)
*G06Q 20/34* (2012.01)
*G06Q 30/0207* (2023.01)
*G07F 7/10* (2006.01)

(52) U.S. Cl.
CPC .......... *B42D 15/047* (2013.01); *B42D 25/285* (2014.10); *Y10T 29/49817* (2015.01)

(56) References Cited

U.S. PATENT DOCUMENTS

| | | | |
|---|---|---|---|
| 6,224,108 B1 | 5/2001 | Klure | |
| 7,032,817 B2 | 4/2006 | Blank | |
| D524,857 S | 7/2006 | Graves et al. | |
| 7,252,225 B2 | 8/2007 | Schultz et al. | |
| 7,607,574 B2 | 10/2009 | Kingsborough et al. | |
| 7,740,170 B2 | 6/2010 | Singh et al. | |
| 9,111,275 B2 | 8/2015 | Miller et al. | |
| 9,852,420 B2 | 12/2017 | Miller et al. | |
| 2004/0254837 A1* | 12/2004 | Roshkoff | G06Q 30/0237 705/7.29 |
| 2006/0149640 A1 | 7/2006 | Gordon et al. | |
| 2006/0161453 A1* | 7/2006 | Kost | G06Q 50/22 705/2 |
| 2006/0261154 A1* | 11/2006 | Arthur | G06Q 20/20 235/380 |
| 2006/0261170 A1 | 11/2006 | Mooney et al. | |
| 2007/0187488 A1* | 8/2007 | Martinez | G06Q 30/00 235/380 |
| 2007/0251994 A1* | 11/2007 | Kingsborough | G06Q 40/025 235/487 |
| 2008/0114696 A1* | 5/2008 | Singh | G06Q 20/3572 705/66 |
| 2008/0185429 A1 | 8/2008 | Saville | |
| 2009/0032586 A1 | 2/2009 | Hunt | |
| 2009/0218392 A1 | 9/2009 | Biskupski et al. | |
| 2009/0218408 A1 | 9/2009 | Biskupski et al. | |
| 2010/0325037 A1* | 12/2010 | Halbur | G06Q 20/10 235/494 |
| 2012/0085828 A1* | 4/2012 | Ziegler | G09F 3/0335 235/494 |

OTHER PUBLICATIONS

Anonymous. Chase Paymentech Reports Gift Card Study Results. Wireless News; Jacksonville [Jacksonville]. Nov. 22, 2008. (Year: 2008).*

Abu-Musa, Ahmad Abdel-Salam, "Evaluating the Security of Computerised Accounting Information Systems: An Empirical Study on the Egyptian Banking Industry," University of Aberdeen (United Kingdom), 2001, ProQuest Dissertations Publishing.

Wu, Yongzhong, et al., "A solution method for the component allocation problem in printed circuit board assembly," Assembly Automation, 2010, pp. 155-163, Emerald Group Publishing Limited.

Filing receipt and specification for provisional patent application entitled "Systems and Methods for Providing a Transaction Card Package Assembly Including Sample Product or Service," by Nikole Henry, filed Apr. 8, 2011 as U.S. Appl. No. 61/473,264.

Filing receipt and specification for provisional patent application entitled "Systems and Methods for Providing a Transaction Card Package Assembly Including Sample Product or Service," by Nikole Henry, filed Jun. 10, 2011 as U.S. Appl. No. 61/495,800.

Foreign communication from a related counterpart application—International Search Report and Written Opinion, PCT/US2012/032392, Aug. 31, 2012, 14 pages.

Foreign communication from a related counterpart application—International Preliminary Report on Patentability, PCT/US2012/032392, Apr. 8, 2014, 10 pages.

* cited by examiner

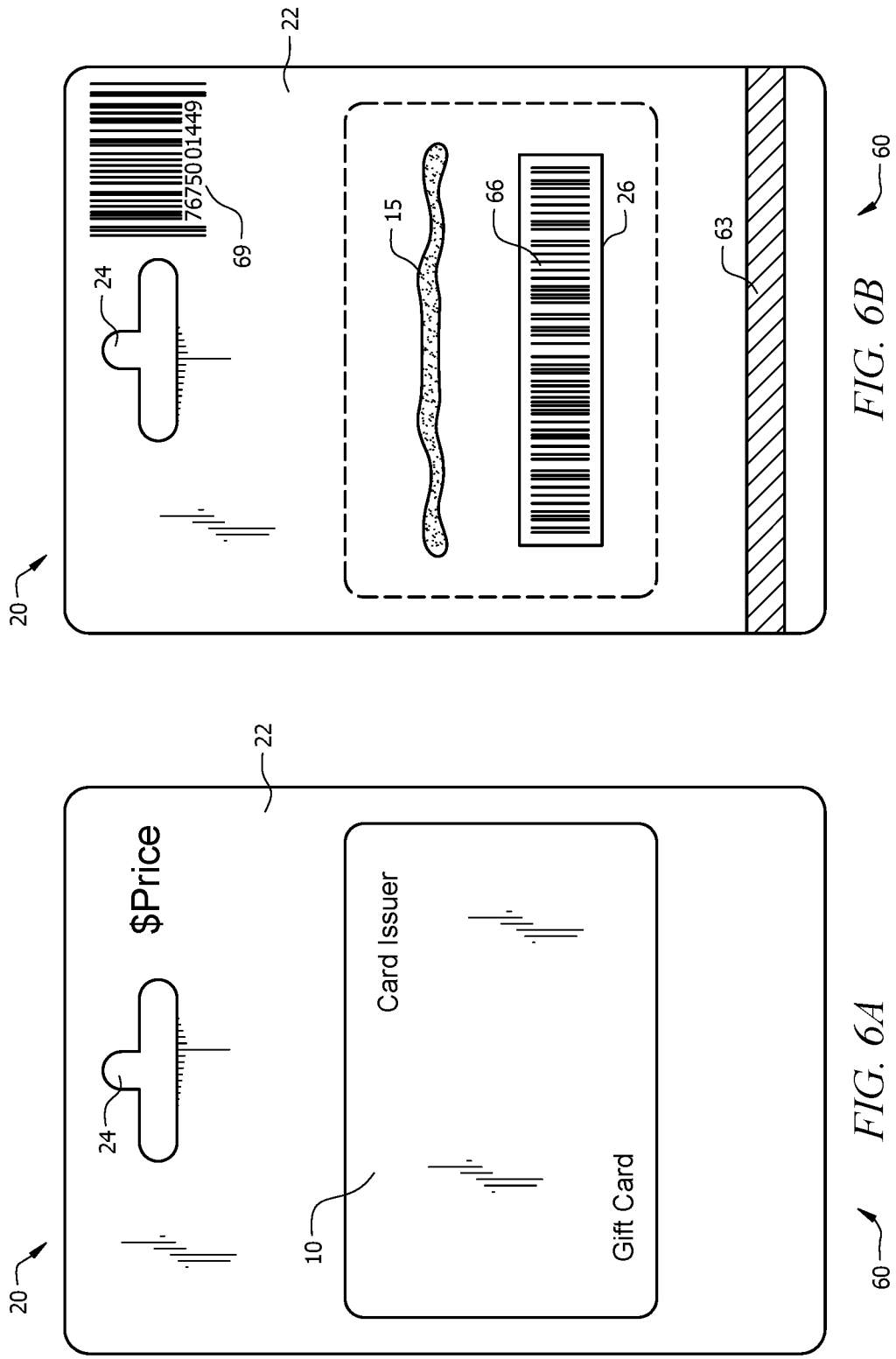

SYSTEMS AND METHODS FOR PROVIDING A TRANSACTION CARD PACKAGE ASSEMBLY INCLUDING SAMPLE PRODUCT OR SERVICE

CROSS-REFERENCE TO RELATED APPLICATIONS

This application is a continuation of and claims priority to U.S. patent application Ser. No. 13/440,530 filed Apr. 5, 2012, which claims priority to U.S. Provisional Patent Application Nos. 61/473,264 filed Apr. 8, 2011 and 61/495,800 filed Jun. 10, 2011, both entitled "Systems And Methods For Providing A Transaction Card Package Assembly Including Sample Product Or Service," the disclosures of which are hereby incorporated herein by reference.

FIELD OF THE INVENTION

The present invention generally relates to package assemblies, methods, and systems for transaction cards, for example, gift cards, debit cards, credit cards, and the like, that include a sample product.

BACKGROUND OF THE INVENTION

The market for transaction cards such as merchant gift cards continues to grow. Such cards may be displayed by a vendor in a retail store for purchase by a consumer. Typically, transaction card displays are prominently placed in areas of high consumer traffic. This visibility and increasing popularity among consumers offers merchants an avenue to promote additional products or services. One such method of promotion is to include at least one sample with at least one transaction card available for purchase.

SUMMARY OF THE INVENTION

Disclosed herein is a transaction card package assembly that includes a sample product. In one embodiment, a transaction card package assembly comprising a card holder, a transaction card, and a sample product. In another embodiment, a transaction card package assembly comprising a card holder, one or more transaction cards, and a sample product.

Also disclosed herein is a computer implemented method and system for processing transaction card package assemblies that include sample products. In an embodiment, a transaction card package assembly processor receives a request from a point of sale terminal requesting correlation of a transaction card package assembly and a sample product. The transaction card package assembly processor compares information conveyed in the request with information stored in a transaction card package assembly datastore to determine if the transaction card package assembly and sample are eligible for correlation. When eligibility is determined, the transaction card package assembly processor correlates the transaction card package assembly with the sample, updates the datastore to reflect the correlation and transmits a response to the point of sale terminal.

In another embodiment, a transaction card package assembly processor receives a transaction request from a point of sale terminal requesting activation of one or more transaction cards that are attached/coupled to a transaction card package assembly comprising a correlated sample; alternatively, requesting deactivation; alternatively, requesting redemption. The transaction card package assembly processor forwards the message to the transaction card package assembly issuer's authorization system and receives a response. The processor transmits the response to the point of sale terminal. Additionally, the processor identifies accounts associated with the transaction card package assembly and the correlated sample in a datastore and records the transaction information in the associated datastore accounts.

In another embodiment, a transaction card package assembly processor receives a data request from an associated entity. The processor identifies and retrieves the requested data and forwards the requested data to the requesting entity. Examples of associated entities include, but are not limited to, transaction card package assembly issuers, sample issuers, transaction card package assembly vendors and transaction card package assembly merchants.

BRIEF DESCRIPTION OF THE DRAWINGS

For a better understanding of the nature of the features of the invention, reference should be made to the following detailed description taken in conjunction with the accompanying drawings, in which:

FIGS. 6A and 7A show various front view embodiments of a transaction card package assembly comprising a card holder, one transaction card and a sample, and FIGS. 6B and 7B show various rear view embodiments of a transaction card package assembly comprising a card holder, one transaction card and a sample.

DETAILED DESCRIPTION OF THE PREFERRED EMBODIMENTS

Figure 1:
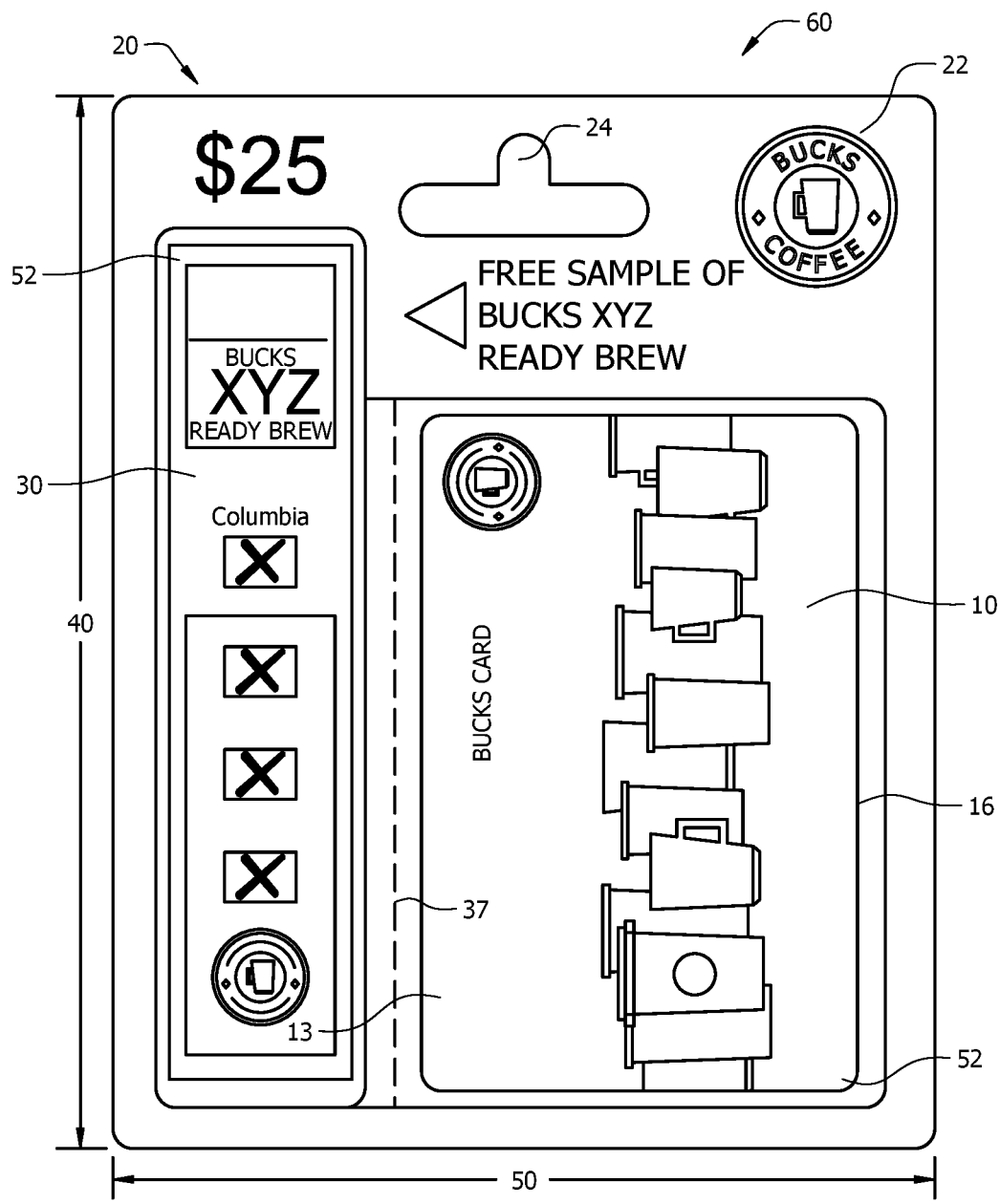
FIGS. 1-4 show various front view embodiments of a transaction card package assembly comprising a card holder, one transaction card and a sample.

As used herein, transaction card refers to a card that may be used to transact business with a party willing to accept the card, for example, as tender for a purchase. Examples of such cards include credit cards, debit cards, gift cards, telephone cards, loyalty cards, membership cards, ticket cards, entertainment cards, sports cards, prepaid cards, and the like. Typically, such cards are wallet-sized and made of plastic. In various embodiments, the transaction card may be a type of card such as a gift or prepaid card that requires activation at a point of sale. In various embodiments, the transaction card may be transferable. For example, a transaction card may be purchased and activated at a point of sale by a consumer and subsequently used by the consumer or another (e.g., the recipient of the card as a gift) to transact business.

Consumer use of transaction cards typically involves a card vendor, a redeeming merchant, and a card issuer. In various embodiments, the card vendor, redeeming merchant and card issuer may be the same, different, or related entities. The point of sale where transaction cards are purchased and activated may be referred to as the card vendor or simply vendor. An entity that will accept a transaction card for business transactions, i.e., as tender for a purchase, may be referred to as a redeeming merchant. An entity that provides the financial backing and/or payment processing accessed via the transaction card may be referred to as the card issuer or simply issuer.

Typically, the issuer is identified on the transaction card and associates a unique issuer account code with each stored value card. Card issuers include direct issuers of cards such as store-branded cards, and in some embodiments the card vendor may also be the card issuer and/or the redeeming merchant. Card issuers also include banks, financial institutions, and transaction processors such as VISA, Mastercard, American Express, etc., and cards issued by such institutions may be readily accepted by a number of redeeming merchants to conduct transactions such as purchases. In some instances, the redeeming merchant may be identified on the transaction card (for example, a retailer branded card such as Store X), and such cards may be sold at the same or different card vendor (e.g., card vendor is Store X or a different or unrelated Store Z). In such instances, the Store X branded transaction card may be issued by Store X, by Store Z, or by a third party such as bank or financial institution.

As used herein, sample refers to at least one product or at least one coupon for a product or service that is distributed at no cost to a consumer, e.g., a gift with the purchase of a transaction card. For example, when a sample is coupled with a transaction card, a consumer pays only the value of the transaction card, but receives in return both the transaction card and the sample. In general, samples are intended for use as a trial of a product or service, specifically to introduce and garner interest in a product or service that is available for purchase. In an embodiment wherein the sample is a product, the sample may a small portion of a product that is commercially available in larger portions. In another embodiment, a sample may be a product that is the same size as a product that is commercially available. Such sample products may be consumable. Alternatively, such sample products may be non-consumable. Such sample products may be ingestible (e.g., food products). Alternatively, such sample products may be non-ingestible. Exemplar sample products may comprise one or more of the following: a crayon; a measuring tape; a small tool; a miniature, facsimile, or scale model of a larger product or item; a cosmetic product; a food product; or candy. In an embodiment, the sample product may be a household item such as a cleaning product (e.g., detergent, etc.) and/or a health and beauty aid such as shampoo, conditioner, soap, toothpaste, dental floss, mouthwash, cosmetic, over the counter medication, etc. In an embodiment, the sample product comprises a dry material that may be contacted with a liquid (e.g., water) to produce a consumable beverage (e.g., a drink mix) such as lemonade mix, cocoa mix, instant coffee, regular (brewable) coffee, coffee beans, etc. In another embodiment, samples may be coupons for the purchase of or discount on a product. Alternatively, samples may be coupons for the purchase of or discount on a service such as, for example, medical or personal care, homecare, auto or other machine repairs, travel, entertainment, internet access or telecommunications access, or the like. In an embodiment, the sample is a trial, limited, or restricted membership or access to a subscription service such as telephone (e.g., wired or wireless), TV (e.g., cable, satellite, etc., including content subscriptions such as pay per view, premium channels or bundles, etc.), Internet service, website access such as social media services and groups, proprietary or premium website content, downloadable content (e.g., downloadable music, software, movies, TV shows, etc.). In an embodiment, the sample product is coffee contained within a sample package comprising a plastic film tube crimped (e.g., heat crimped) closed at each end.

Unless otherwise specified, use of the terms "coupled with," and/or "coupled together" shall be construed as components packaged together. Components, e.g., at least one transaction card and at least one sample, may be coupled together in any suitable way for the purposes of this invention. One non-limiting example is coupling together by releasable attachment of the at least one transaction card and the at least one sample to a common card holder, i.e., releasable attachment by adhesive such as fugitive glue, rubberized glue or cement, hook and loop fastener, clips, rivets, snap and break connections, perforations, or co-molded units with weakened/detachable seam lines, and/or any combination thereof. Another non-limiting example is coupling together by inclusion of the at least one transaction card and the at least one sample within a common pocket- or envelope-style card holder. A further non-limiting example is the at least one transaction card and the at least one sample coupled together in any combination of releasable attachment to and/or containment within a card holder. The releasable attachment and/or containment may be a one-time coupling (e.g. not configured to be reattached once removed) or may be configured for multiple release and reattachment. In an embodiment, the at least one transaction card and the at least one sample are shrink-wrapped together within and/or affixed to a card holder such as a cardboard backer or hanger. In an embodiment, the at least one transaction card and the at least one sample are held within and/or affixed to a card holder such as a cardboard backer or hanger by a clamshell outer packaging component. Preferably, the at least one transaction card and the at least one sample are held within and/or affixed to a card holder via a see-through or transparent outer layer.

In embodiments such as those shown in FIGS. 1-9, transaction card package assembly 60 comprises at least one transaction card 10 and at least one sample 30 attached/coupled to and/or disposed/held within card holder 20. In an embodiment, all or part of transaction card package assembly 60 may be covered in a clear plastic, such as, for example, a laminate, shrink wrap, or a hard plastic case, i.e., a clamshell. As can be seen in FIGS. 1-9, in an embodiment, card holder 20 may be generally square or rectangular in shape having a length 40 and a width 50. The card holder should be sized so that it can accommodate one or more transaction cards and a sample. In an embodiment, the length 40 is about equal to the width 50, for example about 3×3, 3.5×3.5, 4×4. 4.5×4.5, 5×5, 5.5×5.5, 6×6, 6.5×6.5, 7×7, 7.5×7.5, 8×8, 8.5×8.5, or 9×9 inches. In an alternative embodiment, the length 40 and width 50 are different and may be independently selected as about 3, 3.5, 4, 4.5, 5, 5.5, 6, 6.5, 7, 7.5, 8, 8.5, or 9 inches. In other embodiments, the card holder is any shape or size suitable for the purposes of the invention. In other embodiments, the card holder 20 may have a shape promotionally or conceptionally related to the sample 30. For example, if the sample 30 is a drink mix (e.g., instant coffee), then the card holder 20 may be shaped like (e.g., form an outline of) a coffee cup or mug; if the sample 30 is a household items such as detergent, then the card holder 20 may be shaped like a washing machine, etc.

As can be seen in FIGS. 1-7 and 9, in some embodiments, card holder 20 comprises a panel 22 and an opening 24. In other embodiments, as can be seen in FIG. 8, card holder 20 comprises a panel 22 and no opening. Panel 22 may be comprised of plastic, cardboard and/or paper and/or any other material that may be known or developed in the art. In such an embodiment, the at least one transaction card and the at least one sample may be releaseably attached to the panel 22 by any suitable method of releasable attachment discussed herein or known to one of skill in the art such as, for example, an adhesive 15 as shown in FIG. 6B. Alternatively, other types of card holders may be used such as envelopes; folding cards with cut-outs, inserts and/or pockets; clips; hangers; etc. In an embodiment, the at least one transaction card and/or the at least one sample may be enclosed within the card holder 20. When enclosed within card holder 20, the at least one transaction card and/or the at least one sample may be secured within the card holder by any means of releasable attachment. Alternatively, the at least one transaction card and/or the at least one sample may not be secured within the card holder, thereby allowing the card(s) and/or sample(s) to have some movement within the card holder while being secured to the panel 22 via an outer packaging layer (e.g., a transparent layer of film or plastic). In some embodiments, card holder 20 may consist of at least one panel formed or co-joined to form a shape, such as but not limited to, a mug, furniture item, or architectural structure, whereby the at least one transaction card and/or the at least one sample may be contained within or coupled with the shaped card holder. Further, in some embodiments, card holder 20 may have an attached or integrated portion to facilitate stocking and/or displaying. One non-limiting example of such a portion may be an opening such as, for example, opening 24. As can be seen in FIGS. 1-7 and 9, the opening may be a "sombrero" shaped aperture or cut-out suitable for receiving a shelf or rack rod and hanging the package assembly 60 from a display rack in a retail store. Another non-limiting example is an attached support feature such that the package assembly 60 may stand upright on a display shelf, counter, or similar surface.

In an embodiment, the reverse side of transaction card package assembly 60, e.g., the back, may be solid so as to completely obscure from view the at least one transaction card and the at least one sample. Alternatively, as in FIG. 6B, the reverse side of transaction card package assembly 60 may contain one or more windows 26 such as a cut-out or transparent film, wherein all or portions of the at least one transaction card 10 and/or the least one sample 30 are visible. In an embodiment, the reverse side of transaction card package assembly 60 may comprise one or more barcodes such as UPC-A, UPC-E, EAN-13, EAN-8, Matrix, JAN, UCC/EAN-128, Code 39, Code 93 and Code 128 barcodes or combinations thereof. In another embodiment, the reverse side of transaction card package assembly 60 may comprise a magnetic stripe 63 intended for use in activation. In a further embodiment, the reverse side of transaction card package assembly 60 may comprise one or more barcodes and one or more magnetic stripes. An example of such an embodiment is shown in FIG. 6B, wherein the reverse side of transaction card package assembly 60 comprises a EAN/UCC-128 barcode 66 visible through window 26, a EAN/UCC-12 barcode 69, and a magnetic stripe 63. Further, the reverse side of transaction card package assembly 60 may be printed with images, logos, slogans, directions for use, and/or other any other words or graphics.

Figure 2:
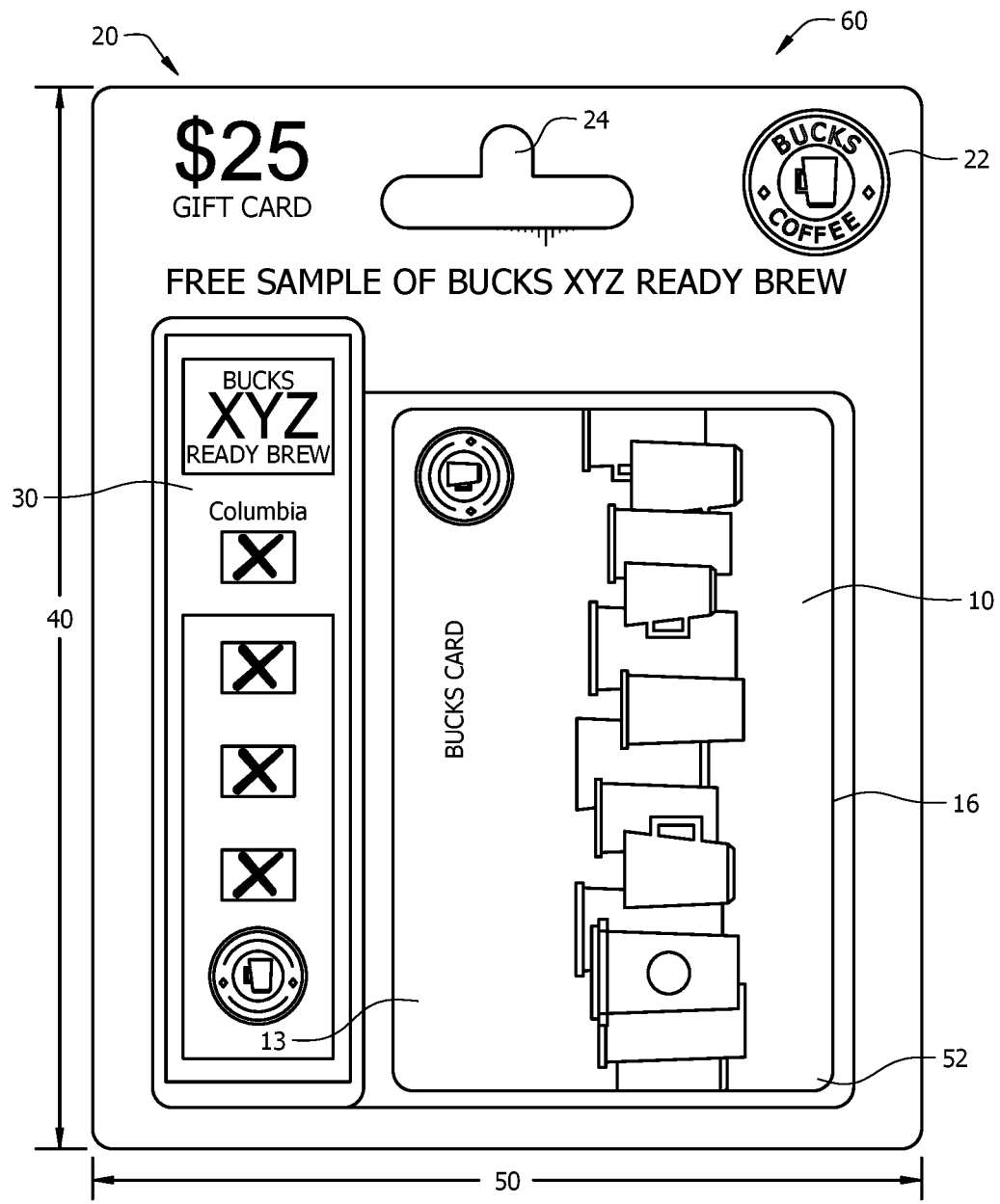
Figure 3:
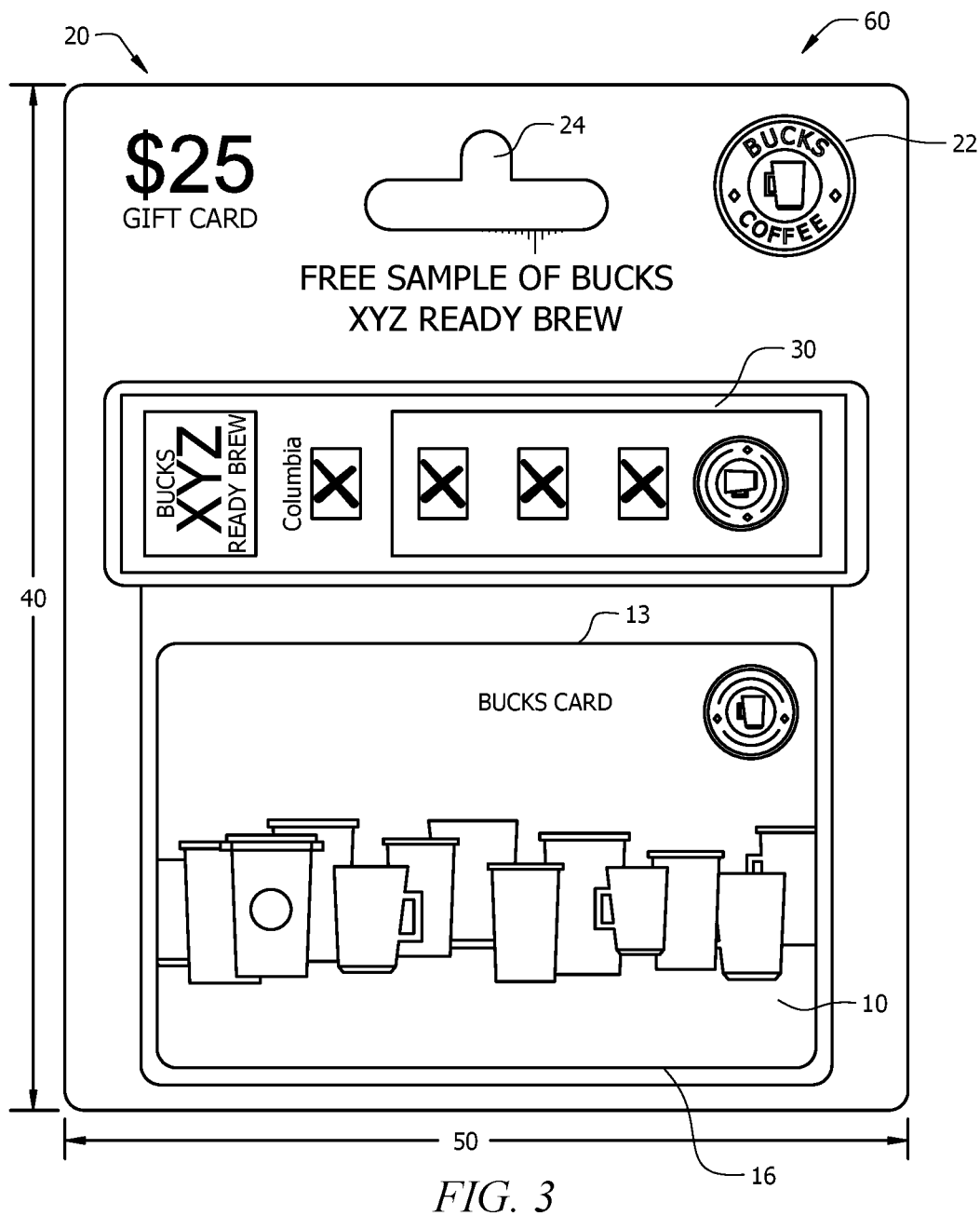
Figure 4:
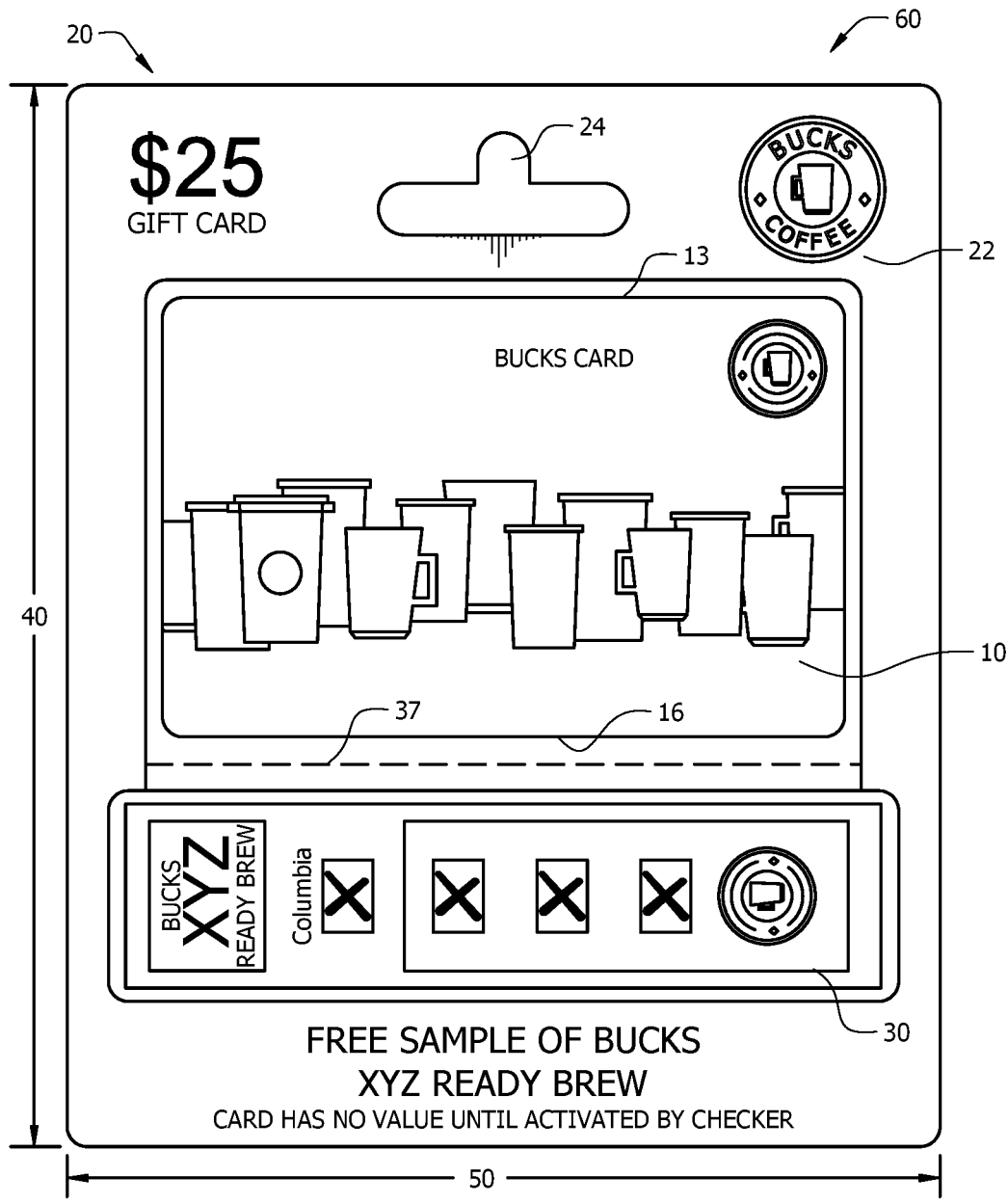

As can be seen in FIGS. 1-4, in an embodiment, transaction card package assembly 60 comprises a transaction card 10, a sample 30, and a card holder 20. In various embodiments, transaction card 10 may be situated vertically on or within card holder 20. As can be seen in FIGS. 1 and 2, transaction card 10 may be situated vertically with the top 13 of transaction card 10 on the viewer's left and the bottom 16 of transaction card 10 on the viewer's right. Alternatively, transaction card 10 may be situated vertically with the top 13 of transaction card 10 on the viewer's right and the bottom 16 of transaction card 10 on the viewer's left. In other embodiments, transaction card 10 may be situated horizontally on or within card holder 20. As can be seen in FIGS. 3 and 4, transaction card 10 may be situated horizontally with the top 13 of transaction card 10 facing up, e.g., right side up. Alternatively, transaction card 10 may be situated horizontally with the top 13 of transaction card 10 facing down, e.g., upside down. In other embodiments, transaction card 10 may be situated diagonally on or within card holder 20. Further, transaction card 10 may be situated at any point on or within card holder 20, for example, in the center, to the right, to the left, toward the top, toward the bottom, etc. As in FIGS. 1-4, in some embodiments, transaction card 10 is situated so that the front side of the transaction card is visible. Alternatively, transaction card 10 may be situated so that the reverse side of the transaction card, e.g., the back, which may contain bar, magnetic or other coding, is visible.

Figure 7A:
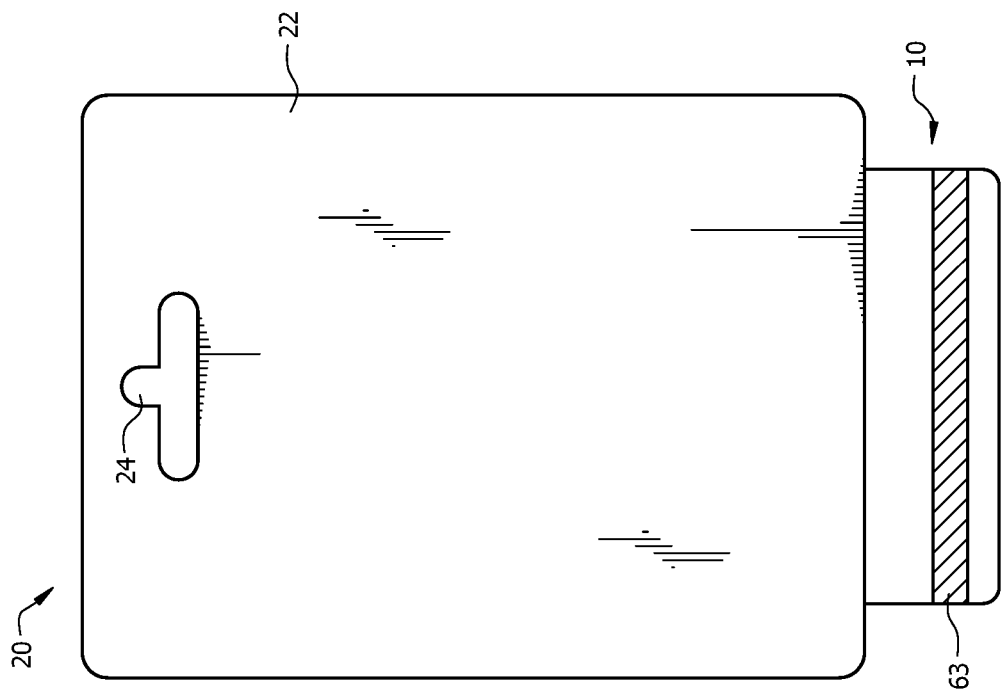
Figure 7B:
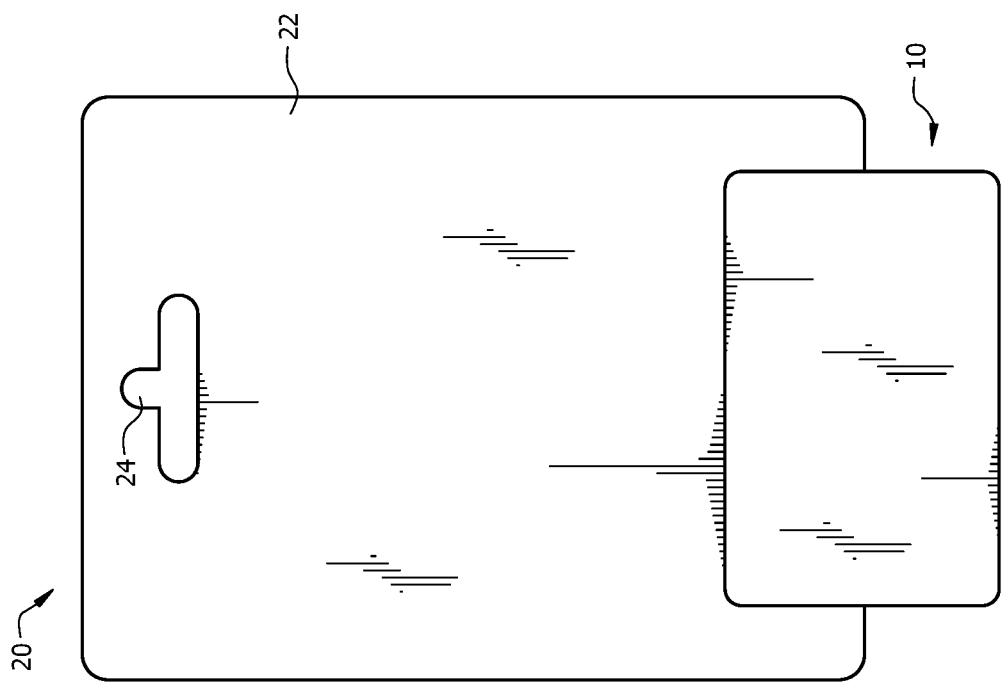

As can be seen in FIGS. 7A and 7B, in an alternative embodiment of a transaction card package assembly comprising a transaction card, a sample, and a card holder, transaction card 10 may be situated on and/or to card holder 20 so that transaction card 10 extends beyond the confines of the card holder 20, e.g, hangs off the card holder. In such an embodiment, transaction card 10 may comprise a magnetic stripe 63 intended for use in activation. Magnetic stripe 63 may be used in an activation transaction without removing transaction card 10 from card holder 20. In an alternative embodiment, transaction card 10 may comprise a barcode intended for use in activation. The barcode may be used in an activation transaction without removing transaction card 10 from card holder 20.

Figures 8A, 8B:
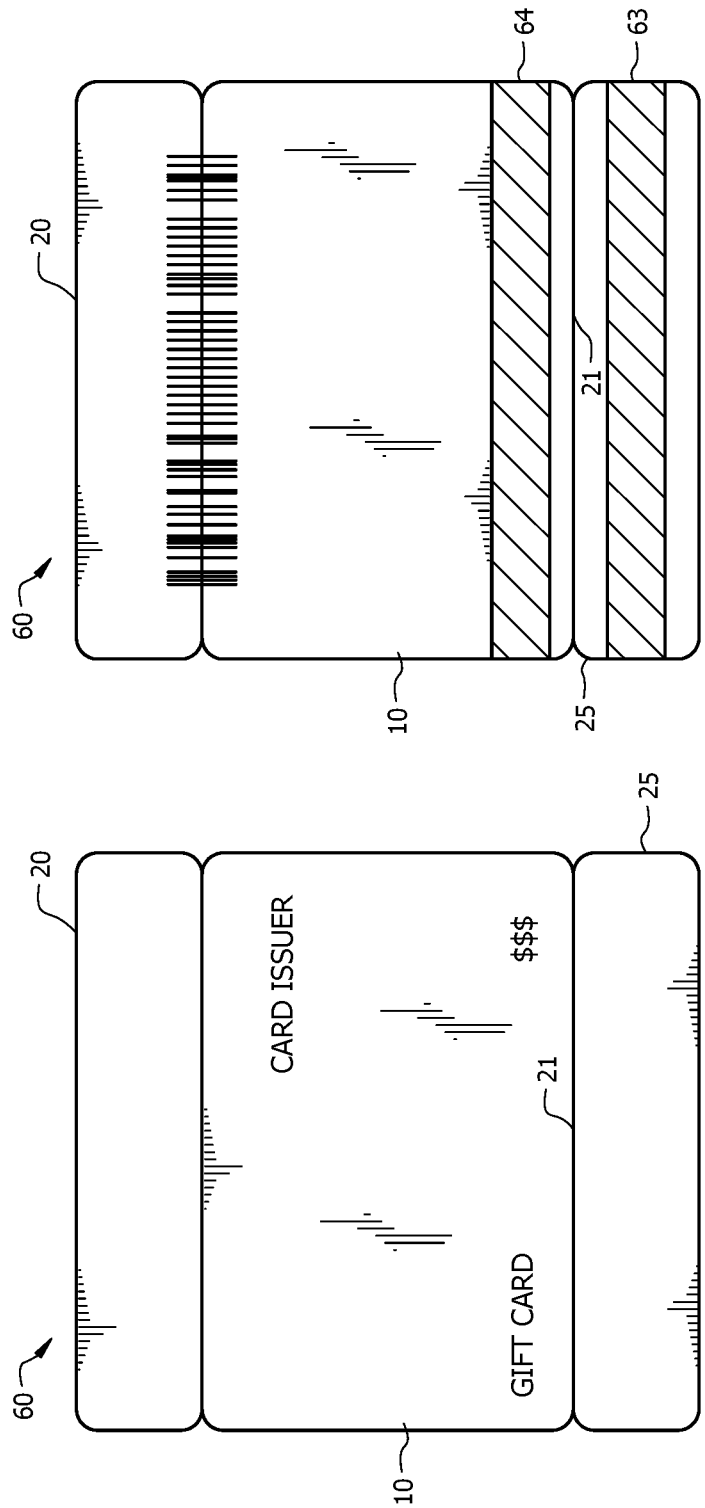
FIG. 8A shows a front view embodiment of a transaction card package assembly comprising a card holder, one transaction card, a sample and a panel.
FIG. 8B shows a rear view embodiment of a transaction card package assembly comprising a card holder, one transaction card, a sample and a panel.

In a further embodiment of a transaction card package assembly comprising a transaction card, a sample, and a card holder, the transaction card package assembly may additionally comprise a second panel 25. As illustrated in FIGS. 8A and 8B, in an embodiment, second panel 25 may be releasably attached to transaction card 10. Alternatively, second panel 25 may be releasably attached to card holder 20. In an embodiment, the means for releasable attachment 21 of second panel 25 to transaction card 10 or, alternatively, to card holder 20 may be, for example, a score or break line in a snap and break connection. In an embodiment, second panel 25 may comprise a magnetic stripe 63 intended for use in activation. As can be seen in FIG. 8B, transaction card 10 may also comprise a magnetic stripe 64. In such an embodiment, magnetic stripe 63 may be separate and distinct from magnetic stripe 64, e.g, magnetic stripe 63 may contain separate and distinct identifiers and/or information from magnetic stripe 64. For example, magnetic stripe 63 may be intended for use in activation and correlation transactions while magnetic stripe 64 may be intended for use only in redemption transactions. Upon activation, second panel 25 may be removed from transaction card 10 or, alternatively, from card holder 20, for example, via snapping and breaking along the releasable attachment 21.

Figure 5:
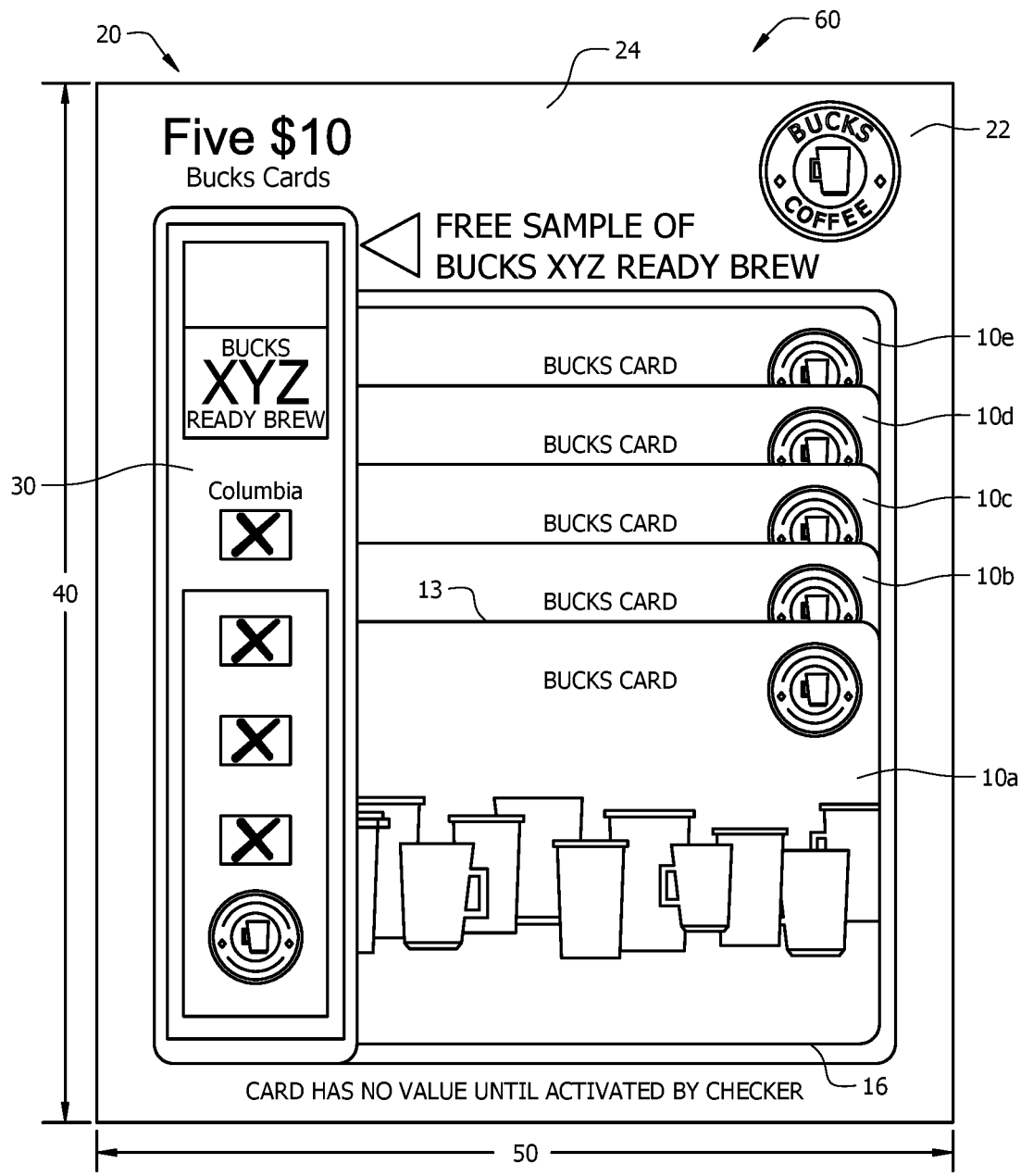
FIG. 5 shows an embodiment of a transaction card package assembly comprising a card holder, multiple transaction cards, and a sample.

Looking now to FIG. 5, in some embodiments, transaction card package assembly 60 comprises multiple transaction cards 10*a*-10*e*, a sample 30, and a card holder 20. Each of transaction cards 10*a*-10*e* has its own top of card 13 and its own bottom of card 16. In an embodiment, a transaction card package assembly comprising multiple transaction cards may comprise two transaction cards; alternatively, three transaction cards; alternatively, four transaction cards; alternatively, five transaction cards; alternatively, any number of transaction cards. Likewise, the transaction card package assemblies may contain a plurality of samples 30, for example arranged in side-by-side, cascading, or other fashion.

As shown in FIG. 5, in an embodiment, transaction cards 10*a*-10*e* may be situated on or within card holder 20 in an off-set stack or cascading arrangement. Transaction cards 10*a*-10*e* may be off-set stacked downward with the top of transaction card 10*e* at the highest point and the bottom of transaction card 10*a* at the lowest point. In this embodiment, the tops of transaction cards 10*b*-10*e* are visible, and the entirety of transaction card 10*a* is visible. Alternatively, transaction cards 10*a*-10*e* may be off-set stacked upward with the top of transaction card 10*a* at the highest point and the bottom of transaction card 10*e* at the lowest point. In this embodiment, the bottoms of transaction cards 10*b*-10*e* are visible, and the entirety of transaction card 10*a* is visible. Alternatively, the transaction cards 10*a*-10*e* may be off-set stacked to either or both sides, e.g., right and/or left. Alternatively, transaction cards 10*a*-10*e* may be off-set stacked diagonally. In another embodiment, transaction cards 10*a*-10*e* may be situated on or within card holder 20 in a stack, i.e., stacked directly on top of one another; alternatively, situated in a fanned arrangement; or, alternatively, situated in any arrangement suitable for the purposes of the invention.

In an alternative embodiment of a transaction card package assembly comprising multiple transaction cards, the transaction cards may be releasably attached to each other. For example, as in FIG. 9, the top 13*a* of transaction card 10*a* may be releasably attached to the card holder 20, the top 13*b* of transaction card 10*b* may be releasably attached to the bottom 16*a* of transaction card 10*a*, the top 13*c* of transaction card 10*c* may be releasably attached to the bottom 16*b* of transaction card 16*b*, etc. The means for releasable attachment 21*a*-21*d* may be, for example, a score or break line in a snap and break connection. Alternatively, the means for releasable attachment 21*a*-21*d* may be any suitable means for the purposes of the invention. Additionally, transaction cards 10*a*-10*d* may be releasably attached to each other using the same means of releasable attachment or, alternatively, the transaction card 10*a*-10*d* may be releasably attached to each other using different means of releasable attachment.

Figure 9A:
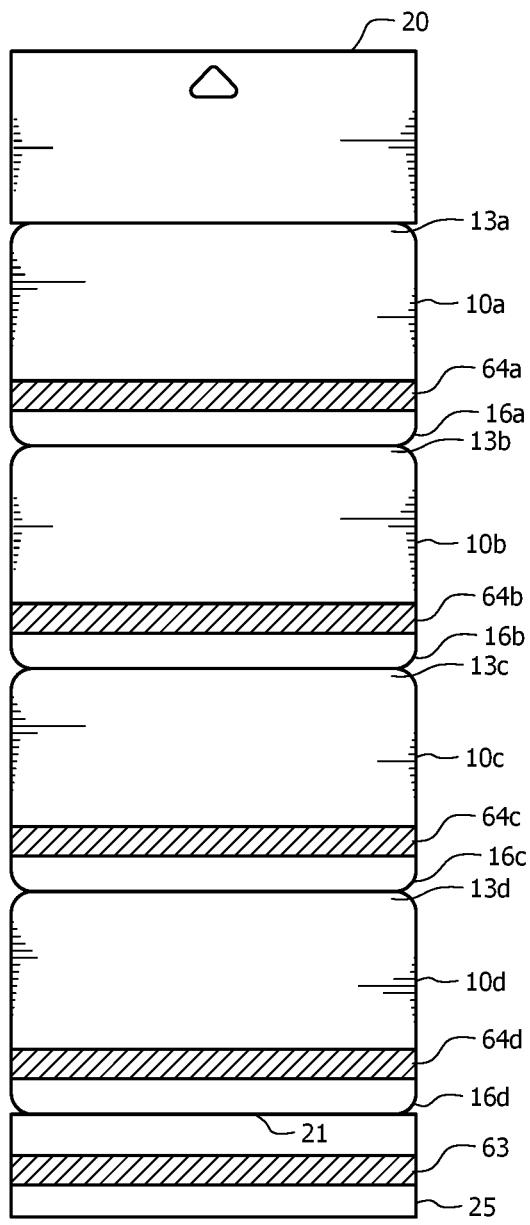
FIG. 9A shows a rear view embodiment of a transaction card package assembly comprising a card holder, multiple transaction cards, a sample and a panel.
Figure 9B:
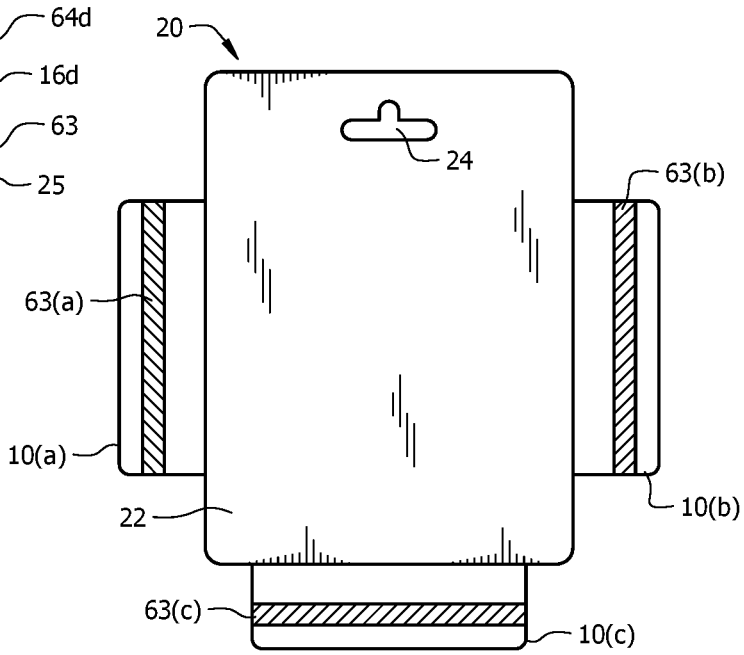
FIG. 9B shows a rear view embodiment of a transaction card package assembly comprising a card holder, multiple transaction cards and a sample.

As can be seen in FIG. 9B, in another embodiment of a transaction card package assembly comprising multiple transaction cards, one or more of the transaction cards 10, e.g., 10(*a*), 10(*b*), and 10(*c*), may be situated on and/or to the card holder 20 so that the one or more transaction cards 10 extend beyond the confines of the card holder, e.g., hang off the card holder. In such an embodiment, the one or more transaction cards may comprise a magnetic stripe 63 intended for use in activation. Such magnetic stripe(s) 63, e.g., 63(*a*), 63(*b*), and 63(*c*), may be used in an activation transaction without removing the one or more transaction cards 10 from the card holder 20. In an alternative embodiment, the one or more transaction cards 10 may comprise a barcode intended for use in activation. The barcode may be used in an activation transaction without removing the one or more transaction cards 10 from card holder 20.

As illustrated in FIG. 9, in a further embodiment of a transaction card package assembly comprising multiple transaction cards, the transaction card package assembly may additionally comprise a second panel 25. Second panel 25 may be releasably attached to any one of the transaction cards. Alternatively, second panel 25 may be releasably attached to the card holder 20. In an embodiment, the means for releasable attachment 21 of second panel 25 to the transaction card or, alternatively, to card holder 20 may be, for example, a score or break line in a snap and break connection. In an embodiment, second panel 25 may comprise a magnetic stripe 63 intended for use in activation. As can be seen in FIG. 9, transaction cards 10*a*-10*d* may each also comprise a magnetic stripe 64*a*-64*d*. In such an embodiment, magnetic stripe 63 may be separate and distinct from magnetic stripes 64*a*-64*d*, e.g, magnetic stripe 63 may contain separate and distinct identifiers and/or information from magnetic stripes 64*a*-64*d*. For example, magnetic stripe 63 may be intended for use in activation and correlation transactions while magnetic stripes 64*a*-64*d* may be intended for use only in redemption transactions. Upon activation, second panel 25 may be removed from the transaction card or, alternatively, from card holder 20, for example, via snapping and breaking along the releasable attachment 21.

In various embodiments, transaction cards 10*a*-10*e* may be situated vertically on or within card holder 20. Transaction cards 10*a*-10*e* may be situated vertically with the tops 13 of transaction cards 10*a*-10*e* on the viewer's right and the bottoms 16 of transaction cards 10*a*-10*e* on the viewer's left. Alternatively, transaction cards 10*a*-10*e* may be situated vertically with the tops 13 of transaction card 10*a*-10*e* on the viewer's left and the bottoms 16 of transaction cards 10*a*-10*e* on the viewer's right. In other embodiments, transaction cards 10*a*-10*e* may be situated horizontally on or within card holder 20. As can be seen in FIG. 5, transaction cards 10*a*-10*e* may be situated horizontally with the tops 13 of transaction cards 10*a*-10*e* facing up, e.g., right side up. Alternatively, transaction cards 10*a*-10*e* may be situated horizontally with the tops 13 of transaction cards 10*a*-10*e* facing down, e.g., upside down. In other embodiments, transaction cards 10*a*-10*e* may be situated diagonally on or within card holder 20. Further, transaction cards 10*a*-10*e* may be situated at any point on or within card holder 20, for example, in the center, to the right, to the left, toward the top, toward the bottom, etc. As in FIG. 5, in some embodiments, transaction cards 10*a*-10*e* are situated so that the front sides of the transaction cards are visible. Alternatively, transaction cards 10*a*-10*e* may be situated so that the reverse sides of the transaction cards, e.g., the backs, which may contain bar, magnetic or other coding, are visible.

As can be seen in FIGS. 1-9, sample 30 may be sized so that it fits on or within the confines of card holder 20. Alternatively, sample 30 may be sized and/or attached so as to extend beyond the boundaries or confines of card holder 20. As in FIGS. 1-4, sample 30 may be situated so that it is positioned next to the one or more transaction cards. Alternatively, as in FIG. 5, sample 30 may be situated so that is it overlapping the one or more transaction cards, or, alternatively, sample 30 may be situated so that it is overlapped by the one or more transaction cards. In an alternative embodiment, sample 30 may be situated directly on a transaction card, e.g., sample 30 may be affixed to the transaction card. In embodiments comprising more than one transaction card, the transaction card package assembly may additionally comprise more than one sample, each sample situated directly on a transaction card. For example, a transaction card package assembly may comprise transaction cards A through D and samples A through D, wherein sample A is situated directly on and/or affixed to transaction card A, sample B is situated directly on and/or affixed to transaction card B, sample C is situated directly on and/or affixed to transaction card C, and sample D is situated directly on and/or affixed to transaction card D.

Further, sample 30 may be situated to the viewer's left of the one or more transactions; alternatively, to the viewer's right; alternatively, situated above the one or more transaction cards; alternatively, situated below the one or more transaction cards. As can be seen in FIGS. 1, 2, and 5, sample 30 may be situated vertically on card holder 20 or, as can be seen in FIGS. 3 and 4, sample 30 may be situated horizontally on card holder 20. In a further embodiment, sample 30 may be situated diagonally on card holder 20.

In embodiments wherein sample 30 is attached or otherwise affixed to or within the card holder, sample 30 may be attached or otherwise affixed to or within card holder 20 in the same manner, e.g., attached by adhesive, clamps, a casing, etc., as the at least one transaction card 10, or, in another embodiment, sample 30 may be attached or otherwise affixed to or within card holder 20 in a different manner than the at least one transaction card 10. Sample 30 may be releasably attached to card holder 20 or, alternatively, to transaction card 10 in such a way that entities affiliated with the transaction card package assembly, such as, for example, vendors, merchants, and/or issuers can remove sample 30 without disturbing any other aspect of transaction card package assembly 60 for such purposes as removing and/or replacing sample 30, updating transaction card package assembly 60 with another sample product, or for any other reason. Such reasons may comprise one or more of the following: updating for promotional period initiation or termination; updating for changes in seasonally directed sample offerings; updating for changes concerning entertainment, sporting, and/or leisure activity sample offerings. Sample 30 may be releasably attached to card holder 20 or, alternatively, to transaction card 10 using any suitable means of releasable attachment discussed herein or known to one of skill in the art. In an embodiment, the card holder 20 (e.g., panel 22) may comprise a removable portion defined by a perforation line or a snap and break line, as represented by dashed line 37 in FIGS. 1 and 4. The removable portion may comprise the sample, which may be removed from the card holder 20 via the perforations or snap and break line, thereby leaving the remainder of the card package assembly 60 comprising the card 10 for continued display and use. In various embodiments, the sample 30 may be removable and/or replaceable, for example with reusable adhesive (e.g., fugitive glue that remains upon the card holder 20 upon removal of the sample 30). Replaceable samples would allow for promotional updates, seasonal changes, and the like.

In an embodiment, sample 30 is provided by the transaction card issuer. Alternatively, the transaction card issuer may reach an agreement with an external party wherein the external party may provide the sample 30. In an embodiment, such an external party may be a vendor that sells transaction card package assembly 60. In another embodiment, the external party may be a merchant that accepts the one or more transaction cards as tender for purchase. In an alternative embodiment, the external party may be unaffiliated with the sale of transaction card package assembly 60 and/or the redemption of the one or more transaction cards.

In embodiments wherein transaction card package assembly 60 comprises a replaceable sample 30, both transaction card package assembly 60 and sample 30 may be packaged so that the assembly and sample may be correlated together. Such correlation may be performed via a point of sale terminal; alternatively, via the transaction card issuer's system; alternatively, via a sample issuer's system; or, alternatively, via a transaction card processing system. Additionally, point of sale terminals and issuers' systems may be configured to cancel correlations. Such correlation between transaction card package assembly accounts and sample accounts may be desirable and/or necessary, for example, to monitor product sales, to track consumer patterns, and/or for any other data collection. In such instances, transaction card package assembly 60 and sample 30 may each comprise a distinct identifier. In an embodiment, a transaction card package assembly and a sample may be correlated together by entering the identifiers at a point of sale terminal, for example, by scanning a bar code, by swiping a magnetic stripe, by manually keying in a code, or combinations thereof. Upon being entered at the point of sale terminal, the identifiers may be conveyed (for example, via a computer network) to a processor, e.g., a third party processor, responsible for looking up the associated accounts (for example, via database reconciliation) and correlating same in a database.

In an embodiment, transaction card package assembly 60 is packaged so that the transaction card or cards contained therein can be activated at a point of sale terminal by either a one-step or a two-step activation process as described in U.S. Pat. No. 7,607,574, to Kingsborough, et al., which is hereby incorporated by reference in its entirety. In such embodiments, transaction card package assembly 60 or a component thereof such as the at least one transaction card 10 or card holder 20, comprises at least three distinct identifiers, namely a vendor product identification code, an issuer account code, and a combination vendor product identification and issuer account code. The three identifiers may be encoded within bar codes, magnetic stripes, electronic tags such as radio frequency identification (RFID) tags, microprocessors or microchips, or combinations thereof. All three identifiers should be externally visible and/or readily accessible on the package assembly or component thereof for use at a point of sale terminal to activate the transaction card or cards. Having all three identifiers present and visible/readily accessible on the package assembly or component thereof, e.g., the at least one transaction card and/or card holder, allows the transaction card or cards to be activated by either a one-step or a two-step activation sequence.

In a two-step activation sequence, the first step comprises entering the vendor product identification code at a point of sale terminal such as a register at a check out lane, which performs a look-up to determine the identity of the product being purchased. For example, the first step may be performed at the point of sale terminal by scanning a bar code, for example, a 12 digit bar code also referred to as an EAN/UCC-12 or UPC-A, containing the vendor product identification code. A price is typically associated with the look-up and product identification. Such price may be fixed, for example incremental denominations such as a $25 card, $50 card, etc. or alternatively may be a variable amount requested by the customer. The second step comprises entering the issuer account code at the point of sale terminal, which is then used to activate the particular account associated with the one or more transaction cards such that the card(s) may be used to transact business with a redeeming merchant. For example, the second step may be performed by swiping a magnetic stripe containing the issuer account code, wherein account information is read from the magnetic stripe and used to activate the account associated with the one or more transaction cards. Alternatively, the second step may be performed by scanning a bar code containing the issuer account code, wherein the account information read from the bar code is used to activate the account associated with the one or more transaction cards. Alternatively, the second step may be performed by reading an RFID tag or computer chip containing the issuer account code, wherein the account information read from the bar code is used to activate the account associated with the one or more transaction cards. Upon being read at the point of sale terminal, the issuer account code may be conveyed (for example, via a computer network) to the issuer or other third party processor responsible for looking up the account code (for example, via a database reconciliation) and activating same.

In a one-step activation sequence, the one step comprises simultaneously entering the combination vendor product identification and issuer account code at a point of sale terminal. For example, the one step may be performed at the point of sale terminal by scanning a bar code, for example an EAN/UCC-128 bar code, containing both a vendor product identification portion and an issuer account portion. The vendor product identification portion may be used to perform a look-up to determine product identity and price as described previously. The issuer account portion may be used to activate the particular account associated with the one or more transaction cards such that the card(s) may be used to transact business with the issuer of the card(s) as described previously. As can be seen from these descriptions, the one-step process only requires a single entry by a clerk operating the point of sale terminal to activate the one or more transaction cards, whereas the two-step process requires two separate steps to activate the one or more transaction cards.

With regard to correlation requests, as previously described, in an embodiment, a transaction card package assembly and a sample each comprise a distinct identifier. When requesting correlation, both the identifier from the transaction card package assembly and the identifier from the sample are entered via a point of sale terminal; alternatively, via a transaction card issuer's system; alternatively, via a sample issuer's system; or, alternatively, via a transaction card processing system. The identifier comprised by the transaction card package assembly may be the issuer account code as described above with relation to one- and two-step activation processes. In such an embodiment, specifically an embodiment wherein a transaction card package assembly is configured to be activated using a two-step activation process, to complete a correlation request, the sample identifier may be entered at a point of sale terminal and the transaction card package assembly identifier, that is, the issuer account code found on the transaction card package assembly, may also be entered at the point of sale terminal, for example, by swiping a magnetic stripe containing the issuer account code, by scanning a bar code containing the issuer account code or by reading an RFID tag or computer chip containing the issuer account code. Alternatively, in an embodiment wherein a transaction card package assembly is configured to be activated using a one-step activation process, to complete a correlation request, the sample identifier may be entered at a point of sale terminal and the transaction card package assembly identifier, that is, the combination vendor product identification and issuer account code found on the transaction card package assembly, may also be entered at the point of sale terminal, for example, by scanning a bar code such as an EAN/UCC-128 bar code containing the combination vendor product identification and issuer account code.

For ease in entering a correlation request at a point of sale terminal, the issuer account code and/or the combination vendor product identification and issuer account code may be visible/readily accessible on the transaction card package assembly or a component thereof. In an embodiment, the issuer account code and/or the combination vendor product identification and issuer account code may be visible/readily accessible on the card holder 20. In an alternative embodiment, the issuer account code and/or the combination vendor product identification and issuer account code may be visible/readily accessible on the transaction card 10. In embodiments wherein the transaction card package assembly comprises multiple transaction cards, each transaction card may comprise a visible/readily accessible issuer account code and/or combination vendor product identification and issuer account code. In such an instance, each individual transaction card may be correlated to a sample. For example, a transaction card package assembly may comprise transaction cards A through D, and transaction cards A through D may each comprise a visible/readily accessible issuer account code and/or combination vendor product identification and issuer account code. A transaction card package assembly vendor may wish to correlate samples A through D with the transaction card package assembly, specifically to correlate sample A with transaction card A, sample B with transaction card B, etc. The vendor may enter the code found on transaction card A and the identifier found on sample A at a point of sale terminal and request correlation of same. The vendor may repeat the process with transaction card B and sample B, transaction card C and sample C, and transaction card D and sample D. In an embodiment, multiple transaction cards comprised in a transaction card package assembly may be correlated with identical samples. Alternatively, multiple transaction cards comprised in a transaction card package may be correlated with different samples.

Figure 10:
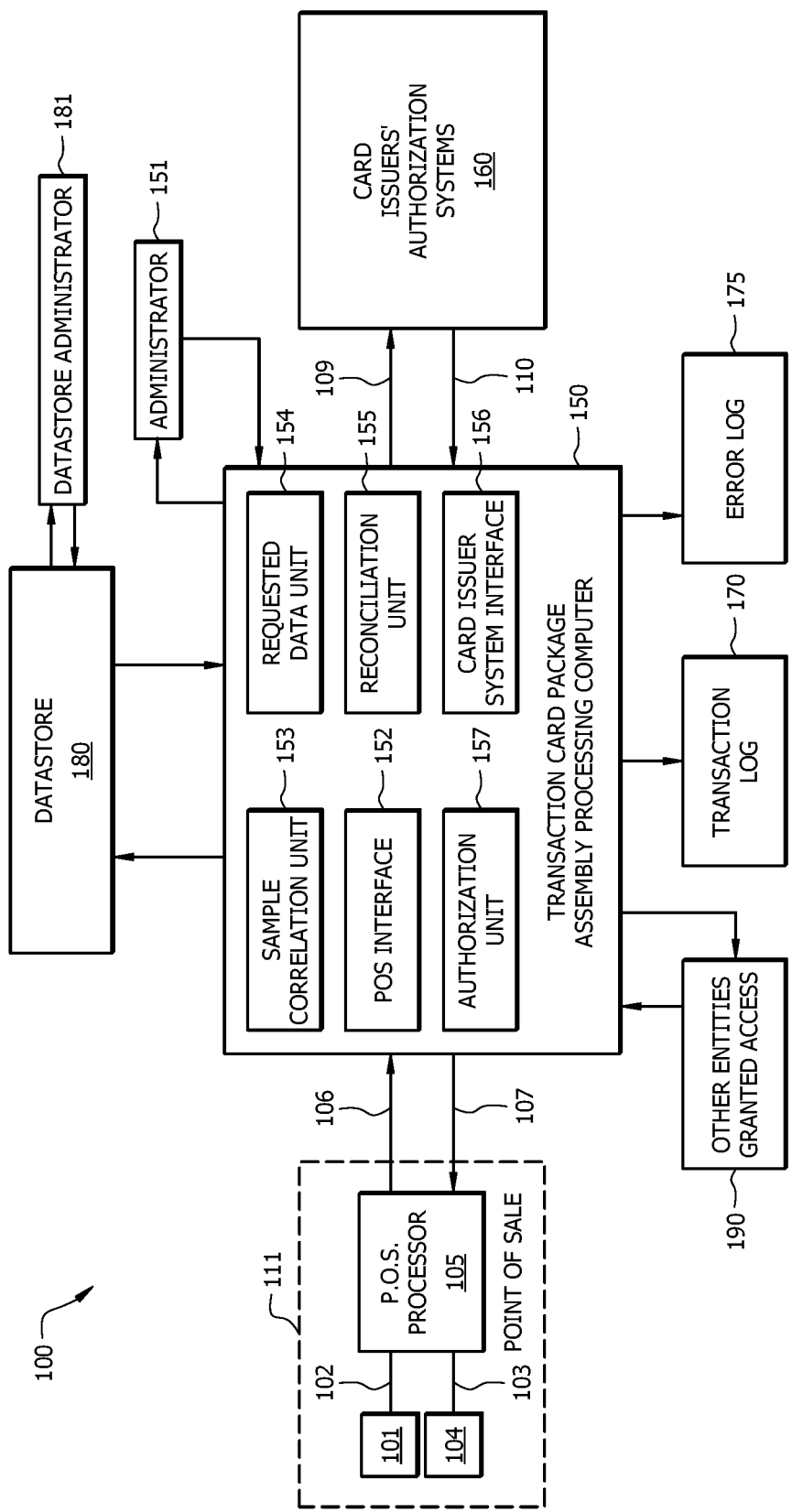
FIG. 10 is a schematic representation of a transaction card package assembly processing system.

FIG. 10 illustrates an exemplary transaction card package assembly processing system 100 in accordance with one embodiment of the present invention. In an embodiment, such a system may be used to process transaction requests such as the correlation and activation requests discussed above as well as redemption and deactivation requests among other types of requests. In one embodiment, the processing system comprises: (a) at least one point of sale unit 111; (b) a transaction card package assembly processing computer 150; (c) a datastore 180 containing transaction card identifiers, sample identifiers, transaction card package assembly identifiers, transaction card account information, sample account information, transaction card package assembly account information, and other information related to activating, redeeming, and managing transaction cards and transaction card package assemblies; (d) at least one individual transaction card issuers' authorization system 160; and (e) any other unit included in the system by the processing system administrator 151. In one embodiment, the processing computer 150 comprises a sample correlation unit 153, a POS interface 152, a requested data unit 154, a reconciliation unit 155, a card issuer system interface 156, and an authorization unit 157. The POS Interface 152 provides a means for the processing computer 150 to communicate with the point of sale unit 111 via, for example, the Internet, a Public Switched Telephone Network (PSTN), or an independent dedicated network. Likewise, the processing computer 150 may communicate with the transaction card issuers' authorization system 160 via, for example, the Internet, a Public Switched Telephone Network (PSTN), or an independent dedicated network. Communications 106, 107 between the POS interface 152 and the point of sale unit 111 and communications 109, 110 between the card issuer system interface 156 and the card issuers' authorization systems 160 may be encrypted for added security and/or may utilize a virtual private network (VPN).

As can be seen in FIG. 10, at the point of sale unit 111 (typically located at a vendor and/or redeeming merchant), the identifier on the transaction card package assembly, on the transaction card and/or on the individual sample is interpreted 102 by a point of sale interpretation unit 101 (e.g., a code reader). The point of sale interpretation unit 101 can comprise a human, a bar code scanner, magnetic stripe reader, optical character recognition device, or other device configured to interpret the data encoded in the identifier on the transaction card package assembly, on the transaction card and/or on the sample.

Contemporaneously with the interpretation of the identifier(s), a request for correlation, activation, redemption or deactivation 103 by a point of sale transaction unit 104 is made. The point of sale transaction unit 104 can comprise a human, an electronic input device, a register, a computer processing unit ("CPU"), or other means of requesting the correlation between the transaction card package assembly identifier or individual transaction card identifier and the sample identifier, or the activation, redemption or deactivation of the transaction card identifier interpreted by the point of sale interpretation unit 101. In some embodiments, the actions performed by the point of sale interpretation unit 101 and the point of sale transaction unit 104 may be performed by one unit capable of performing both actions that would be performed by the individual units.

The point of sale interpretation unit 101 and the point of sale transaction unit 104 communicate with the point of sale processing unit 105. The point of sale processing unit 105 can comprise a CPU or other type of processing device accepted for use in the industry. The point of sale interpretation unit 101 communicates at least one of the transaction card package assembly identifier, the transaction card identifier, and the sample identifier to the point of sale processing unit 105. The point of sale transaction unit 104 communicates the request for correlation, activation, redemption or deactivation of the identifier(s) interpreted by the point of sale interpretation unit 101 to the point of sale processing unit 105. The point of sale processing unit 105 communicates 106 with the processing computer 150 (e.g., transmits a message requesting correlation, activation, redemption or deactivation). In some embodiments, the actions performed by the point of sale interpretation unit 101, the point of sale transaction unit 104, and the point of sale processing unit 105 may all be performed by one unit (e.g., an integrated POS device such as a computerized register) capable of performing all the actions that would be performed by the individual units.

The point of sale processing unit 105 is connectable to the processing computer 150 via a suitable network, such as the Internet, the public switched telephone network (PSTN), or an independent dedicated network. Each point of sale processing unit 105 has an associated identifier that may be transmitted to the processing computer 150 during the course of connecting the point of sale processing unit 105 to the processing computer 150. Each point of sale processing unit 105 may include multiple point of sale transaction units 101, 104 corresponding to individual terminals each with its own terminal identification.

As depicted in FIG. 10, the processing computer 150 is configured to: (a) form a secure connection with the transaction card package assembly vendor (e.g., via the point of sale unit 111), the card issuers' authorization systems 160, and any other entities 190 authorized to access the processing computer 150 by the processing system administrator 151; (b) communicate with card issuers' authorization systems 160 to request and receive activation or deactivation of transaction cards; (c) communicate with card issuers' authorization systems 160 to redeem all or a portion of the value, services, or products associated with the transaction cards; (d) correlate transaction card package assemblies and/or individual transaction cards with samples; (e) generate and maintain a transaction log 170 of all activities performed; (f) generate and maintain an error log 175 of all activities unsuccessfully completed and reasons therefor; (g) use the POS Interface 152 to communicate to the transaction card package assembly vendor via the POS unit 111 the activation or deactivation of the transaction card and any information concomitant with the activation or deactivation of individual transaction cards, i.e. the communication of PINs associated with activated transaction cards; and (h) use the POS Interface 152 to communicate to the transaction card package assembly vendor via the POS unit 111 any reasons why requested transactions cannot not be completed.

The processing computer 150 may comprise a singular processing unit (e.g., a centralized server or data center), a plurality of processing units (e.g., a distributed computing system with various units distributed and in communication with each other), or combinations thereof, with concomitant storage capabilities, each capable of or designated for: accessing the datastore 180; creating a transaction log 170; creating and maintaining an error log 175; communicating with transaction card package assembly vendors; communicating with the transaction card issuers' authorization systems 160; processing transaction card package assembly and sample correlation requests; correlating individual transaction card package assembly identifiers and/or individual transaction card identifiers with individual sample identifiers; processing transaction card activation and/or deactivation requests; processing transaction card redemption requests; and communicating with other systems 190 capable of and authorized to communicate with the processing computer 150.

Datastore 180 maintains records of accounts associated with each transaction card package assembly indicating: (a) the specific sample correlated with each transaction card package assembly and/or transaction card, (b) whether a sample correlated with a transaction card package assembly and/or a transaction card is replaceable, (c) the samples eligible for correlation with each transaction card package assembly and/or transaction card, (d) whether the one or more transaction cards contained within/coupled to a transaction card package assembly have been activated or deactivated, (e) whether the one or more transaction cards contained within/coupled to a transaction card package assembly have been redeemed, (f) records and details of each redemption request for the one or more transaction cards contained within/coupled to a transaction card package assembly, (g) the monetary amount remaining on the one or more transaction cards contained within/coupled to a transaction card package, (h) conditions required for activation and redeeming the one or more transaction cards contained within/coupled to a transaction card package, (i) identity of the transaction card issuer, (j) any combination thereof.

The processing computer 150 is also configured to generate and maintain a transaction log 170 of all activity involving the processing computer 150. The transaction log may comprise a detailed summary of: (a) requested transaction card package assembly and sample correlations; (b) requested transaction card activations; (c) requested transaction card deactivations; (d) the monetary amount ascribed to transaction card activations; (e) the monetary amount ascribed to transaction card deactivations; (f) the time transaction cards were activated; (g) the time transaction cards were deactivated; (h) the transaction or communication performed with the transaction card issuer to activate a transaction card; (i) the transaction or communication performed with the transaction card issuer to deactivate a transaction card; (j) the PIN communicated to the transaction card package assembly vendor in response to a request to activate a transaction card requiring the input of a PIN for use; (k) any other information the processing system administrator 151 directs the processing computer 150 to maintain as a log entry; and (m) any combination thereof.

The information contained in the transaction log 170 may be used to generate reconciliation reports, settlement reports, payment reports, audit reports, or other forms of information aggregation for the benefit of, use by, or for provision to, the processing system administrator 151, the datastore administrator 181, transaction card package assembly vendors, transaction card package assembly issuers, transaction card package assembly issuers' authorization systems 160, redeeming merchants, or other interested parties. For example, the transaction log 170 contains information about each transaction performed by processing computer 150 and may be utilized by the reconciliation unit 155 when reconciling accounts belonging to various vendors, merchants, transaction card package assembly issuers and the processing system administrator.

Oversight and maintenance of the processing computer 150 is performed by the processing system administrator 151. Although not required, in an alternative embodiment, the processing system administrator 151 may also function as the datastore administrator 181. The processing computer 150 is configured to generate and maintain an error log of all transactions that were not completed and reasons therefor. In some embodiments, the error log is administered by the processing system administrator 151.

As noted above, the processing computer 150 is configured to determine which samples are eligible for correlation with a particular transaction card package assembly. Additionally, the processing computer 150 is configured to receive instructive communication 110 from the transaction card issuers' authorization systems 160 concerning transaction card package assembly and sample correlation eligibility. This information is processed in the sample correlation unit 153 and stored as data in the appropriate accounts in the datastore 180.

When the processing computer receives a request for correlation, the processing computer 150 may then compare the transaction card package assembly or individual transaction card identification and the sample identification contained within the correlation request to data saved in the datastore 180 to determine whether the transaction card package assembly or individual transaction card and the sample are eligible for correlation together. For example, a particular transaction card issuer may have an agreement with an external party wherein the external party's samples may be releasably attached to the issuer's transaction card package assemblies. Thus, the external party's samples are eligible for correlation with the issuer's transaction card package assemblies. In another example, a particular transaction card issuer may wish to replace seasonal samples releasably attached to transaction card package assemblies with new samples. Thus, the seasonal samples are no longer eligible for correlation with the transaction card package assemblies while the new samples are eligible for correlation. In yet another example, a particular transaction card issuer may pre-approve multiple samples, any one of which may be releasably attached to the issuer's transaction card package assembly at the transaction card package assembly vendor's discretion. Thus, any one of the pre-approved samples is eligible for correlation with the transaction card package assembly. If a transaction card package assembly or individual transaction card and a sample are determined eligible for correlation, the processing computer 150 effectuates the correlation in the sample correlation unit 153. The processing computer 150 also updates the appropriate transaction card package assembly, individual transaction card and/or sample accounts in the datastore 180 to reflect the new correlation and to memorialize any previous correlation information as correlation history.

In embodiments wherein a correlation request is received requesting correlation of a sample to a transaction card package assembly or individual transaction card that is already correlated to a different sample, the processing computer 150 may compare the information received in the correlation request to data stored in the datastore 180. If the transaction card package assembly or individual transaction card is not authorized to be correlated with more than one sample, but is eligible for correlation with the sample requested in the correlation request, the processing computer 150 cancels the previous correlation and effectuates the correlation between the requested sample and the transaction card package assembly or individual transaction card. Alternatively, if the transaction card package assembly or individual transaction card is authorized to be correlated with more than one sample and is eligible for correlation with the requested sample, the processing computer 150 effectuates the correlation of the requested sample and the transaction card package assembly or individual transaction card without canceling the previous correlation unless otherwise instructed. In all embodiments, the processing computer 150 updates the appropriate transaction card package assembly, individual transaction card and/or sample accounts in the datastore 180 to reflect the new correlation and to memorialize any previous correlation information as correlation history.

The processing computer 150 is also configured to process activation, deactivation and redemption requests. Upon receipt of an activation, deactivation or redemption request for a transaction card from the transaction card package assembly vendor, the processing computer 150 accesses the datastore 180 of transaction card identification data. The processing computer 150 processes the information contained in the datastore 180 and communicates 109, 110 with the individual transaction card issuers' authorization systems 160 to effectuate activation, deactivation or redemption of the transaction card. The processing computer's 150 communication with the individual transaction card issuers' authorization systems 160 may occur simultaneously or independently.

The processing computer 150 is also configured to communicate to the transaction card package assembly vendor 107 the status of a request for activation, deactivation or redemption of a transaction card and to communicate any necessary PIN information required by activated transaction cards to the transaction card package assembly vendor in order for the transaction card package assembly purchaser to be apprised of that information for use of the purchased individual transaction card.

The processing computer 150 is further configured to communicate with other entities 190 authorized to access the transaction card package assembly processing system and specifically authorized to access processing computer 150. These other entities may comprise third party payment management systems, third party audit systems, card issuer affiliated entities, card vendor affiliated entities, redeeming merchants or redeeming merchant affiliated entities, financial institutions, such as banks and credit unions, or any other entity provided access by the processing system administrator 151.

There may arise situations wherein a correlation, activation, redemption or deactivation request is received by the processing computer 150, but the information in the datastore 180 pertaining to the transaction card package assembly identification, the transaction card identification and/or the sample identification received by the processing computer 150 precludes completion of the request. For example, a transaction card package assembly vendor may send a correlation request for a specific sample and a specific transaction card package assembly that have not been authorized for correlation together. Upon receiving the correlation request, the processing computer 150 will compare the transaction card package assembly identification and the sample identification with data from the datastore 180 and determine that the specific transaction card package assembly identifier and the specific sample identifier cannot be correlated together. In another example, a transaction card may have been previously activated, returned to the point of sale for a refund, but not deactivated prior to reshelving. In that case, when a subsequent customer purchases that transaction card and an activation request is communicated to the processing computer 150, the datastore 180 account accessed by the processing computer 150 will indicate that the transaction card is already activated. In a further example, the transaction card identification received by the processing computer 150 may be associated with a datastore 180 account that indicates the card has already been redeemed for the entire amount. In these and other similar situations, the processing computer 150 will communicate a message to the transaction card package assembly vendor that the transaction cannot be completed.

The sample correlation unit 153 processes transaction card package assembly and sample correlation eligibility instruction received from transaction card issuers' authorization systems 160, sample issuers' authorization systems, and/or transaction processing systems and updates the appropriate one or more accounts stored in the datastore 180 to reflect the instruction. The transaction card package assembly and sample correlation eligibility instruction received from a transaction card issuer's authorization system 160, sample issuer's authorization system, and/or transaction processing system may contain one or more of the following pieces of information: (a) one or more transaction card package assembly identifications, (b) one or more individual transaction card identifications, (c) one or more sample identifications, (d) authorization for one or more sample identifiers to be correlated with one or more transaction card package assembly identifiers or one or more individual transaction card identifiers, (e) the date a given correlation becomes eligible, (f) the date a given correlation becomes ineligible, (g) identification of one or more vendor locations wherein a correlation is eligible, (h) identification of the transaction card issuer, (i) identification of the sample issuer, and (j) any combination thereof. The information contained within the transaction card package assembly and sample correlation eligibility instruction is not limited to the enumerated list but may include other items in addition to the items enumerated or in place of the items enumerated above.

The sample correlation unit 153 also receives correlation requests from the point of sale terminal 111 and uses information contained within the correlation request as well as information contained in datastore 180 to determine whether the transaction card package assembly or individual transaction card and the sample which the point of sale unit 111 is attempting to have correlated are eligible for correlation. The correlation request from the point of sale unit 111 may contain one or more of the following pieces of information: (a) transaction card package assembly identification, (b) individual transaction card identification, (c) sample identification, (d) point of sale terminal identification, (e) the time of the correlation request, (f) the date of the correlation request, (g) identification of the card issuer for the transaction card package assembly, (h) identification of the sample issuer (i) identification of the correlating vendor, (j) location of correlating vendor, and (k) any combination thereof. The information contained within the correlation request is not limited to the enumerated list but may include other items in addition to the items enumerated or in place of the items enumerated above.

When processing a correlation request, the sample correlation unit 153 compares the information received in the correlation request to information stored in the datastore 180 to determine if any of the criteria for correlating the requested transaction card package assembly or individual transaction card and sample are met. For example, the transaction card issuer may have provided that a transaction card package assembly offered for sale is eligible for correlation with a specific sample only during a designated period of time. Alternatively, the transaction card issuer may have provided that a transaction card package assembly comprising multiple transaction cards is eligible for correlation with a first sample but not a second sample while a transaction card package assembly comprising a single transaction card is eligible for correlation with the second sample but not the first sample. Alternatively, the transaction card issuer may have provided that a transaction card package assembly offered for sale at vendor X is eligible for correlation with a sample while an identical transaction card package assembly offered for sale at vendor Y is ineligible for correlation with the same sample. For example, the card issuer may be trying to promote a regional product through the sample. In such an instance, vendor X may be located in the region wherein the product is for sale, and vendor Y may not be located in the region wherein the product is for sale. Alternatively, the card issuer may have reached an agreement with an external party wherein the external party provides the samples for the transaction card package assemblies. In such an instance, the external party may be affiliated with vendor X, but unaffiliated and/or in competition with vendor Y. Once the criteria for correlation are determined to be met, the sample correlation unit 153 correlates the transaction card package assembly or individual transaction card identifier with the sample identifier and updates the appropriate accounts in the datastore 180.

The request data unit 154 processes data requests received from the transaction card issuer's authorization system 160, the point of sale terminal 111, and/or the one or more other entities 190 granted access to the processing computer 150. The data requests may contain requests for any of the various data found in the processing computer 150, the transaction log 170, the error log 175 and/or the datastore 180. The data request may request one or more of the following: (a) identification of samples correlated to specific transaction card package assemblies, (b) identification of samples correlated to specific transaction cards, (c) identification of any entities requesting correlation of specific samples to specific transaction card package assemblies, (d) location of any entities requesting correlation of specific sample to specific transaction card package assemblies, (e) time and date of correlation request for specific samples to specific transaction card package assemblies, (f) activation of specific transaction card package assemblies with correlated samples, (g) activation of specific transaction card package assemblies without correlated samples, (h) identification of vendors activating specific transaction card package assemblies, (i) location of vendors activating specific transaction card package assemblies, (j) time and date of activation of specific transaction card package assemblies, (k) redemption of specific transaction cards, (l) redemption of transaction cards from specific transaction card package assemblies with correlated samples, (m) redemption of transaction cards from specific transaction card package assemblies without correlated samples, (n) identification of vendors redeeming specific transaction cards, (o) location of vendors redeeming specific transaction cards, (p) time and date of redemption of specific transaction cards, and (q) any combination thereof. The information requested is not limited to the enumerated list but may include other items in addition to the items enumerated or in place of the items enumerated above. Such requested data may be used for data mining, tracking, analysis, etc.

After the requested data unit 154 processes a data request, the requested data unit 154 identifies where the requested information is located, i.e, in the processing computer 150, in the datastore 180, in the transaction log 170, in the error log 175 or any combination thereof. The requested data unit 154 retrieves the requested information and forwards the retrieved requested information to the entity that requested it, i.e., the card issuers' authorization systems 160, the point of sale terminal 101, other entities 190 granted access to the processing computer 150 or any combination thereof, as a report that may be printed or viewed electronically or in any other form suitable to the purposes of the invention.

The reconciliation unit 155 reconciles the accounts of various transaction card package assembly issuers, transaction card package assembly vendors, and/or transaction card package assembly redeeming merchants to credit and debit appropriate merchants, vendors, issuers and the processing system administrator with the value of various transactions to reflect which entities received value from which other entities. For example, if a vendor A sells a transaction card package assembly issued by transaction card package assembly issuer B for a specified amount and receives payment from a customer, then an account associated with the transaction card package assembly is credited with the payment amount, the vendor A receives a percentage (e.g., retains a percentage) of the purchase amount and/or a predetermined amount, the processing system administrator receives a percentage of the purchase amount and/or predetermined amount, and card issuer B receives the remainder. As another example, if a transaction card package assembly issued by transaction card package assembly issuer C is redeemed at merchant D to purchase items, then the amount redeemed is debited to issuer C and credited to merchant D, sometimes minus a transaction fee collected by issuer C and/or a transaction fee collected by processing system administrator.

Authorization unit 157 is utilized when the processing computer 150 is also the authorizing system such that the processing computer 150 authorizes correlation, activation, deactivation, and redemption requests rather than transmitting the request to the card issuers' authorization systems 160 for authorization. When the authorization unit 157 is utilized, the processing computer 150 may transmit details of transactions, rather than authorization requests, to the card issuers' authorization systems 160.

In some embodiments, the transaction card issuer, the authorization system, and the processing computer are part of the same entity. In such an embodiment, there would be no card issuers' authorization systems 160 or the card issuers' authorization systems 160 would be under common control with the other units of the processing computer 150 (for example, a commonly owned and operated computing system that may be centralized (e.g., part of a centralized data center) and/or distributed within a commonly owned or controlled system or network). Furthermore, it should be noted that although units associated with the processing computer 150 (e.g., units 152-157) are depicted as various units within a single data processing system for illustration and conceptual purposes, one or more of units 152-157 could be implemented on separate computers, systems, or servers in a distributed data processing environment.

Figure 11:
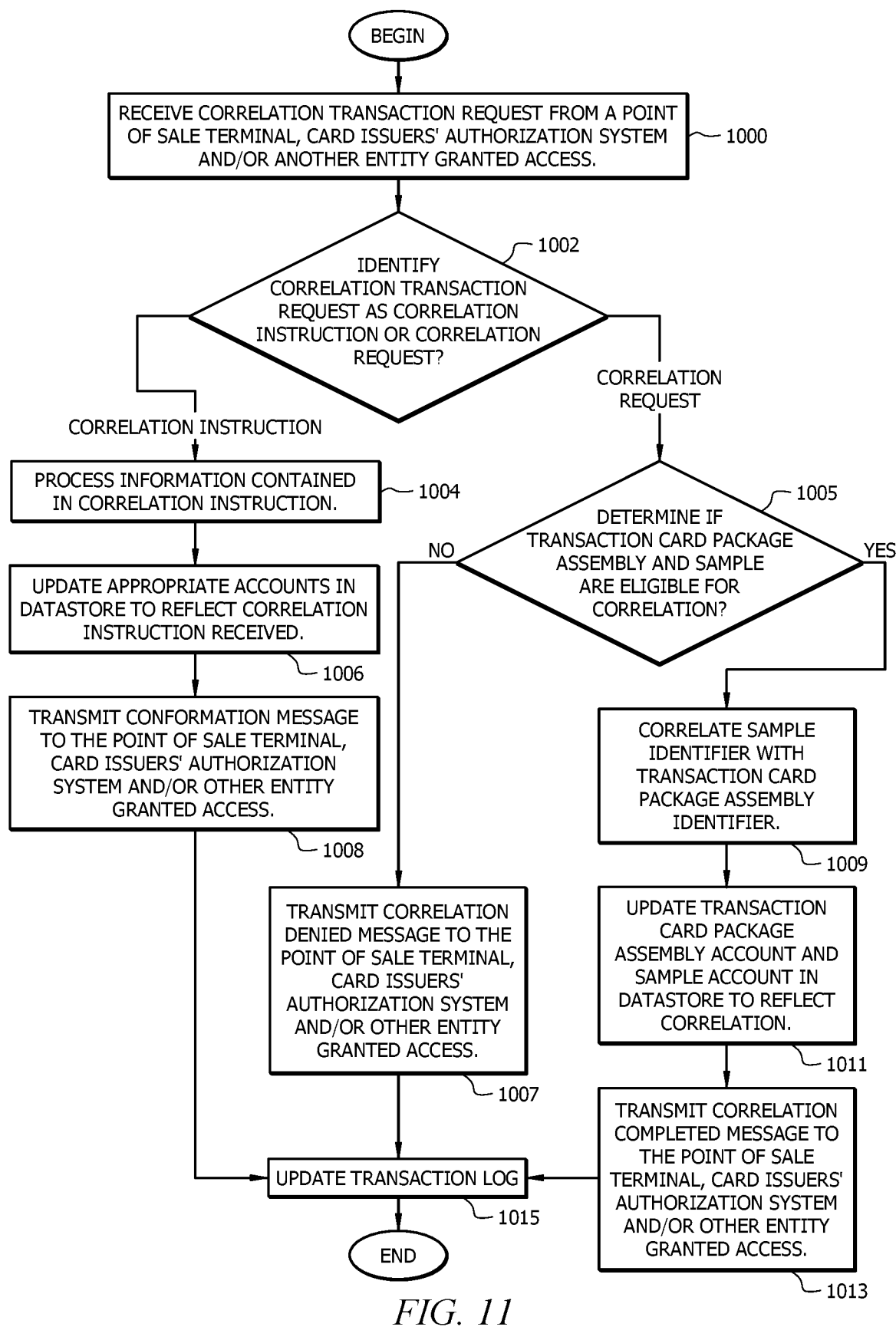
FIG. 11 is a flowchart depicting an exemplary process utilized by a transaction card package assembly processing computer for correlating a transaction card package assembly with a sample.

An exemplary method utilized by a processing computer 150 for correlating a transaction card package assembly or an individual transaction card with a sample in accordance with one embodiment of the present invention is depicted in FIG. 11. To begin, in block 1000, the processing computer 150 receives a correlation transaction request from a point of sale terminal, transaction card package assembly issuer's authorization system and/or another entity granted access to the processing computer 150. Using the sample correlation unit, in block 1002, the processing computer 150 identifies the correlation transaction request as either a correlation instruction or a correlation request.

If the correlation transaction is identified as a correlation instruction, then in block 1004, the processing computer 150 processes the information contained in the instruction. The correlation instruction comprises one or more of the following: (a) one or more transaction card package assembly identifications, (b) one or more individual transaction card identifications, (c) one or more sample identifications, (d) authorization for one or more sample identifiers to be correlated with one or more transaction card package assembly identifiers or one or more individual transaction card identifiers, (e) the date a given correlation becomes eligible, (f) the date a given correlation becomes ineligible, (g) identification of one or more vendor locations wherein a correlation is eligible, (h) identification of the transaction card issuer, (i) identification of the sample issuer, and (j) any combination thereof. The correlation instruction may comprise other information in addition to or in place of the above enumerated items. The correlation instruction may instruct the processing computer 150 to authorize correlation between a transaction card package assembly and a sample;

alternatively, between an individual transaction card and a sample; alternatively, between a transaction card package assembly and any one of multiple samples; alternatively, between an individual transaction card and any one of multiple samples; alternatively, between a transaction card package assembly and multiple samples; alternatively, between an individual transaction card and multiple samples; alternatively, between multiple transaction card package assemblies and a sample; alternatively, between multiple transaction card package assemblies and any one of multiple samples; alternatively, between multiple transaction card package assemblies and multiple samples; alternatively, between any combination thereof. Furthermore, the correlation instruction may instruct the processing computer 150 that one or more previously authorized correlations between transaction card package assemblies or individual transaction cards and samples are now ineligible. The correlation instruction may also include conditions for correlation eligibility. For example, the eligibility may have an expiration that is different from any expiration dates associated with the transaction card package assembly. Furthermore, the correlation instruction may specify specific vendors and/or locations wherein a transaction card package assembly or individual transaction card and a sample may be eligible for correlation which may be different from the comprehensive list of vendors and/or locations wherein the transaction card package assembly is offered for sale.

Upon processing the information, in block 1006, the processing computer updates the appropriate one or more transaction card package assembly accounts, one or more individual transaction card accounts, and one or more sample accounts in the datastore 180 to reflect the correlation instruction received. At block 1008, the processing computer sends a confirmation message to the entity which sent the correlation instruction (i.e., the card issuers' authorization systems or another entity granted access to the processing computer) confirming receipt of the instruction. The method proceeds to block 1015 as described in more detail below.

If the processing computer 150 identifies the correlation transaction request as a correlation request, then in block 1005, the processing computer 150 compares the information contained in the correlation request to information stored in the datastore 180. The correlation request presents a transaction card package assembly or individual transaction card and a sample to be correlated together and comprises one or more of the following pieces of information: (a) transaction card package assembly identification, (b) individual transaction card identification, (c) sample identification, (d) point of sale terminal identification, (e) the time of the correlation request, (f) the date of the correlation request, (g) identification of the card issuer for the transaction card package assembly, (h) identification of the sample issuer (i) identification of the correlating vendor, (j) location of correlating vendor, and (k) any combination thereof. The correlation request may comprise other information in addition to or in place of the above enumerated items. In block 1005, the processing computer uses the comparison between the information received in the correlation request and the data in the datastore 180 to determine if the transaction card package assembly or individual transaction card and the sample presented in the correlation request are eligible for correlation.

If the transaction card package assembly or individual transaction card and the sample are not eligible for correlation, then in block 1007, the processing computer 150 transmits a correlation denied message to the requesting entity (i.e., a point of sale terminal, a card issuer's authorization system, or another entity granted access to the processing computer). The method proceeds to block 1015 as described in more detail below.

If the transaction card package assembly or individual transaction card and the sample are eligible for correlation, then in block 1009, the processing computer 150 correlates the sample identifier with the transaction card package assembly or individual transaction card identifier. At block 1011, the processing computer 150 updates the corresponding transaction card package assembly or individual transaction card account in the datastore 180 to reflect correlation with the sample, and, in block 1013, the processing computer 150 transmits a correlation completed message to the requesting entity (i.e., a point of sale terminal, a card issuer's authorization system, or another entity granted access to the processing computer).

The processing computer 150, in block 1015, may then record the details of the correlation transaction in a transaction log 170. The details of the transaction log may include: (a) the time and date of the correlation transaction, (b) whether new correlation instruction was received, (c) any newly authorized correlations, (d) any previously authorized correlations now ineligible, (e) conditions associated with correlations, (f) whether a correlation request was received, (g) identification of the transaction card package assembly or individual transaction card and the sample to be correlated, (h) whether the transaction card package assembly or individual transaction card and the sample were correlated, (i) the identity of the card issuer, (j) the identity of the sample issuer, (k) the identity of the requesting entity, (l) the location of the requesting entity, and (m) any combination thereof. The transaction log may include other information in addition to or in place of the items enumerated above.

Figure 12:
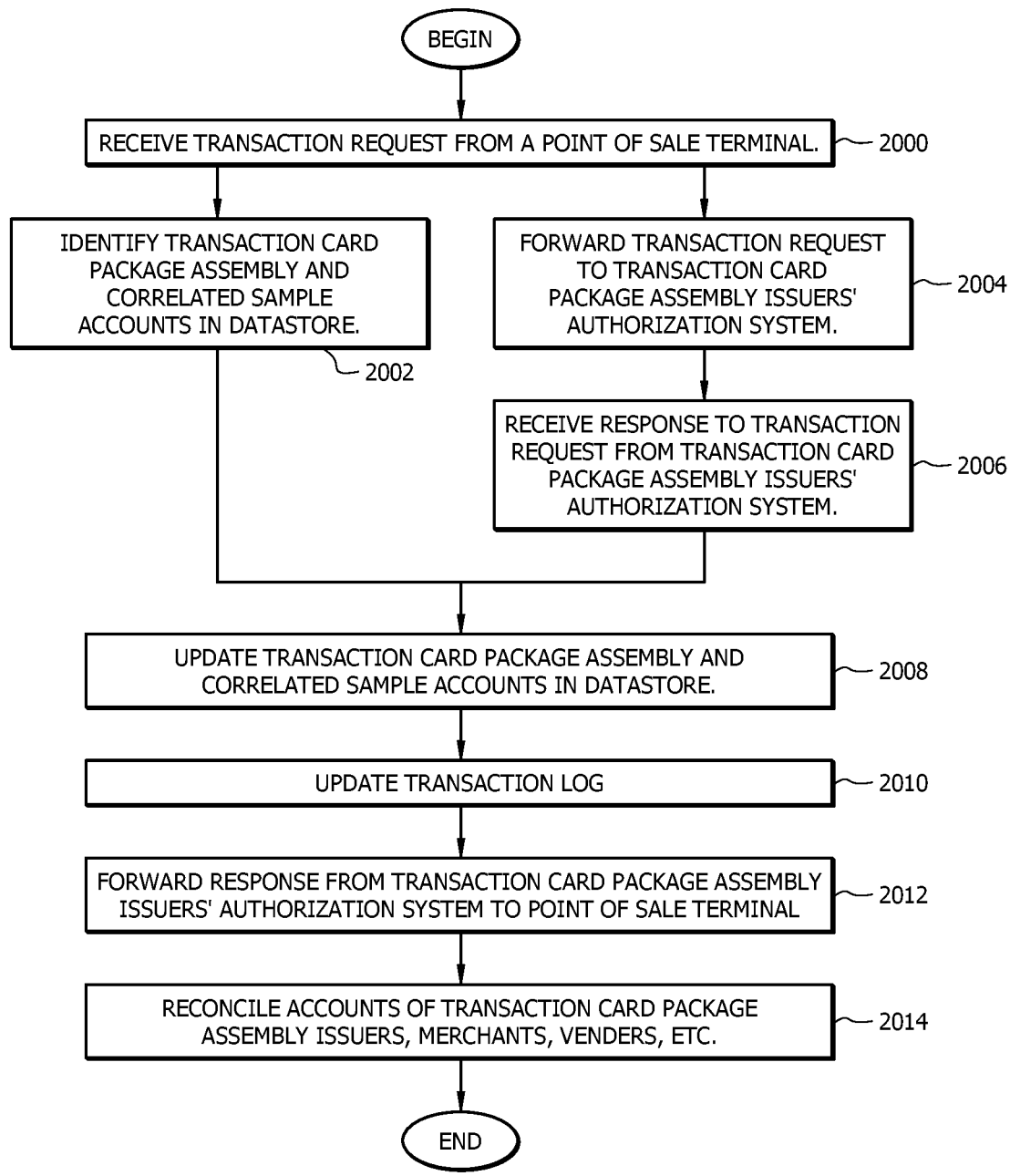
FIG. 12 is a flowchart depicting an exemplary process utilized by a transaction card package assembly processing computer for activating, redeeming or deactivating a transaction card package assembly.

An exemplary process utilized by a processing computer 150 for activating, redeeming or deactivating a transaction card package assembly in accordance with one embodiment of the present invention is depicted in FIG. 12. To begin, in block 2000, the processing computer 150 receives a transaction request from a point of sale terminal. The transaction request comprises one or more of the following: (a) identity of the terminal, (b) identity of the transaction card package assembly, (c) a request for activation of the transaction card package assembly, (d) a request for redemption of a transaction card coupled to/held within the transaction card package assembly, (e) an amount of the card activation, (f) an amount of the card redemption, (g) the identity of the transaction card issuer, (h) the identity of the activating vendor, (i) the identity of the requesting location, (j) the time of the transaction request, (k) the date of the transaction request, and (l) any combination thereof. The transaction request may comprise other information in addition to or in place of the above enumerated items. After receiving the transaction request, in block 2002, the processing computer 150 uses the information comprised in the transaction request to identify the transaction card package assembly account and any correlated sample account(s) stored in the datastore 180. In block 2004, the processing computer 150 forwards the transaction request as received from the point of sale terminal 111 to the appropriate one of the card issuers' authorization systems 160. In the embodiment illustrated in FIG. 12, the processing computer identifies the transaction card package assembly account and any correlated sample account(s) while simultaneously forwarding the request to the card issuers' authorization systems. In an alternative embodiment, the processing computer first identifies the transaction card package assembly account and any correlated sample accounts and subsequently forwards the request to the card issuers' authorization systems. In another embodiment, the processing computer first forwards the request to the card issuers' authorization systems and subsequently identifies the transaction card package assembly account and any correlated sample account(s).

The processing computer 150 receives the response message from the appropriate one of the card issuers' authorization systems 160 in block 2006. At block 2008, the processing computer updates the transaction card package assembly account in the datastore to reflect the concomitant changes in the status of the transaction card package assembly and/or the transaction card coupled to/held within the transaction card package assembly. Additionally, the transaction card package assembly account and any correlated sample account(s) may be updated to reflect any conditions associated with the transaction. A transaction log 170 may also be updated by the processing computer 150 in block 2010. The account information to be stored in the datastore 180 as well as the details of the transaction recorded in the transaction log 170 may include: (a) the time and date of the transaction, (b) whether the transaction card package assembly was activated, (c) the reason the transaction card package assembly was not activated if the activation request was denied, (d) the amount credited to the transaction card package assembly account when activated, (e) conditions associated with redeeming the at least one transaction card coupled to/held within the transaction card package assembly, (f) the identification of any correlated sample(s), (g) the identity of the activating vendor, (h) the identity of the card issuer, (i) the identity of any sample issuers if the transaction card package assembly is correlated to a sample, (j) the location of the activating vendor, (k) the identity of the terminal activating the transaction card package assembly, (l) the requested redemption amount, (m) the reason the transaction card was not redeemed if the transaction request was denied, (n) the amount debited from the transaction card package assembly account when redeemed, (o) the identity of the redeeming merchant vendor, (p) the location of the redeeming merchant, (q) the identity of the terminal redeeming the transaction card, and (r) any combination thereof. The transaction log may include other information in addition to or in place of the items enumerated above.

The processing computer 150, in block 2012, then forwards the response message to the point of sale terminal 111. The processing computer 150, prior to forwarding the response message to the point of sale unit 111, may modify the response message as necessary to include information that may be printed on a receipt for the customer and/or presented on a display to the store clerk operating the point of sale unit 111. At block 2014, the processing computer 150 reconciles the accounts of the various vendors, merchants, card issuers, the processing system administrator, and other entities involved with issuing, selling, redeeming, and marketing the transaction card package assembly to debit and credit appropriate accounts and, in some embodiments, initiate funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various transaction card package assemblies thus requiring fewer funds transfers to be initiated.

In various embodiments, the sequence of events depicted in blocks 2008, 2010, 2012, and 2014 may be varied, and thus may be carried out in any desired order, sequentially or simultaneously. Moreover, the requested transaction may involve multiple transaction cards. In such a scenario, the transaction process proceeds as described above, however the transaction request will comprise multiple sets of transaction information for each of the multiple transaction cards comprising the instant transaction request. Further, in the multiple transaction card scenario, any activation amount or redemption amount may be allocated across the multiple transaction cards equally or disproportionately as desired by any of the card transaction interested parties and/or card purchasers/redeemers.

The transaction card package assembly and transaction card package assembly system of the instant disclosure also provide manufacturers, vendors, issuers, and other transaction processing entities a means to monitor, track, compare and/or analyze the effects of providing a sample with the purchase of a transaction card. Sales of the instantly described transaction card package assemblies comprising at least one sample may be compared, contrasted, and/or otherwise analyzed to sales of similar transaction card package assemblies comprising a differing at least one sample and/or to sales of similar transaction card package assemblies not comprising at least one sample. Likewise, the sale and/or use of a product may be tracked by comparing, contrasting and/or otherwise analyzing the sale and/or use of the product during a time period wherein transaction card package assemblies comprising a sample associated to the product are offered for sale versus the sale and/or use of the product during a time period wherein transaction card package assemblies comprising a sample associated to the product are not offered for sale. Such comparison, contrast, and/or other analysis may be utilized by manufacturers, vendors, issuers, and other transaction processing entities to review, predict, schedule, promote, and/or otherwise determine the efficacy of the inclusion of at least one sample on the sale of transaction cards, the sale of transaction card package assemblies, and/or the sale and/or use of a product associated with the included at least one sample. The monitoring, tracking, comparing, and/or analyzing the effects of providing at least one sample with the purchase of a transaction card may be performed concerning any of the instantly described transaction card package assemblies, transaction cards, samples, or combinations thereof.

As discussed above, manufacturers, vendors, issuers and/or other transaction card processing entities may wish to analyze data relating to transaction card package assemblies, transaction cards, samples and/or any combination thereof. In an embodiment of the disclosed transaction card package assembly processing system, such data may be recorded during correlation and/or other transaction requests and stored in a processing computer, a datastore, a transaction log, an error log or any combination thereof. To access the data, manufacturers, vendors, issuers and/or other transaction card processing entities may request the data from the processing computer.

Figure 13:
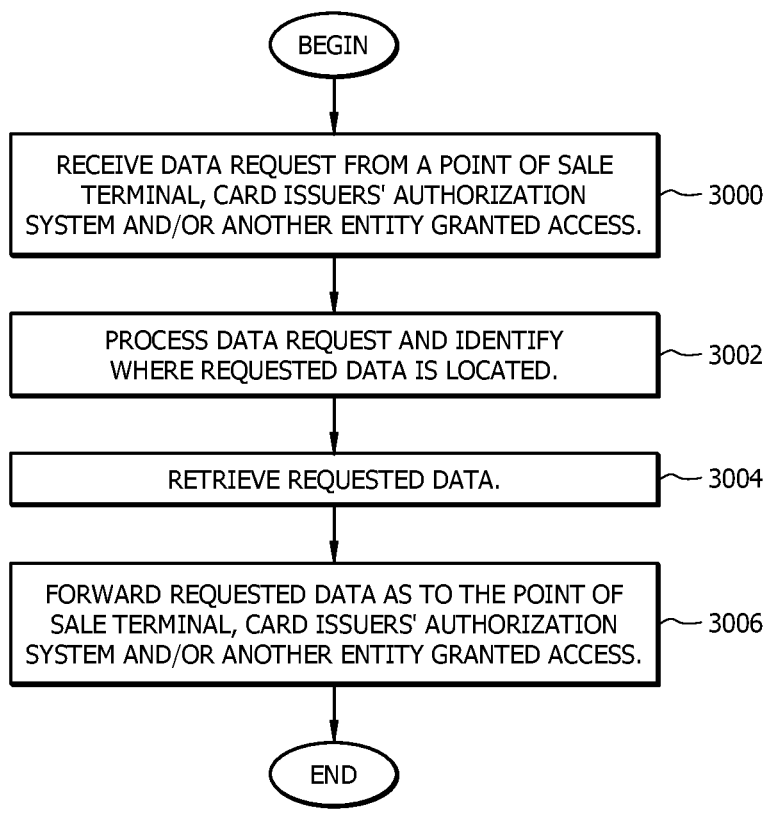
FIG. 13 is a flowchart depicting an exemplary method utilized by a transaction card package assembly processing computer for providing data to a requesting entity

An exemplary method utilized by a processing computer for providing data to a requesting entity in accordance with an embodiment of the present invention is depicted in FIG. 13. To begin, in block 3000, the processing computer 150 receives a data request from a point of sale terminal, a card issuer's authorization system, a processing computer administrator and/or another entity granted access to the processing computer 150. The data request may request one or more of the following: (a) identification of samples correlated to specific transaction card package assemblies, (b) identification of entity requesting correlation of specific samples to specific transaction card package assemblies, (c) location of entity requesting correlation of specific samples to specific transaction card package assemblies, (d) time and date of correlation request for specific samples to specific transaction card package assemblies, (e) activation of specific transaction card package assemblies with correlated samples, (f) activation of specific transaction card package assemblies without correlated samples, (g) identification of vendors activating specific transaction card package assemblies, (h) location of vendors activating specific transaction card package assemblies, (i) time and date of activation of specific transaction card package assemblies, (j) redemption of specific transaction cards, (k) redemption of transaction cards from specific transaction card package assemblies with correlated samples, (l) redemption of transaction cards from specific transaction card package assemblies without correlated samples, (m) identification of vendors redeeming specific transaction cards, (n) location of vendors redeeming specific transaction cards, (o) time and date of redemption of specific transaction cards, and (p) any combination thereof. The information requested is not limited to the enumerated list but may include other items in addition to the items enumerated or in place of the items enumerated above.

In block 3002, the processing computer 150 processes the request and identifies where the requested data is located, e.g., in the datastore 180, the transaction log 170, the error log 175, any other unit of the processing computer 150 and/or any combination thereof. In block 3004, the processing computer 150 retrieves the data from the one or more locations in which it is stored, and, in block 3006, the processing computer 150 forwards the data as a message to the requesting entity. In an embodiment, the forwarded message comprising the data may be received and viewed in a digital format. Alternatively, the forwarded message comprising the data may be received and viewed as a print-off (e.g., printed on paper).

The disclosed transaction card package assemblies including sample products and computer implemented methods and systems relating to transaction card package assemblies including sample products may be further described by the following enumerated embodiments:

1. A transaction card package assembly comprising:
   a transaction card;
   a sample; and
   a card holder.
2. The package assembly of 1 wherein the sample product is consumable.
3. The package assembly of 2 wherein the sample product is instant coffee.
4. The package assembly of 1 wherein the sample product comprises at least one of a crayon, a measuring tape, a small tool, cosmetic product, and candy.
5. The package assembly of 1 wherein the card holder comprises a panel and an opening.
6. The package assembly of 5 wherein the transaction card and sample are releasably attached to the cardholder.
7. The package assembly of 6 wherein the sample or another sample may be attached or reattached to the card holder.
8. The package assembly of 1 wherein the card holder is in the style of an envelope or pocket.
9. The package assembly of 8 wherein the transaction card and sample are enclosed within the card holder.
10. The package assembly of 1 wherein the card holder comprises a panel and an outer layer for retaining the transaction card and sample without the transaction card or sample being attached to the cardholder.
11. The package assembly of 9 wherein the outer layer is a transparent plastic layer or film.
12. The package assembly of 1 wherein the transaction card is packaged so that it can be activated in a one-step activation process.
The package assembly of 1 wherein the transaction card is packaged so that it can be activated in a two-step activation process
14. The package assembly of 1 wherein the package assembly comprises one or more encoded identifiers.
15. The package assembly of 14 wherein the one or more encoded identifiers are located on the transaction card, on the cardholder or both.
16. The package assembly of 14 wherein the encoded identifiers are one or more of a vendor product identification code, an issuer accounts code, a combination vendor product identification and issuer account code, or any combination thereof
17. The package assembly of 1 wherein the sample comprises one or more encoded identifiers.
18. A transaction card package assembly comprising:
   multiple transaction cards;
   a sample product; and
   a card holder.
19. The package assembly of 18 wherein the sample product is consumable.
20. The package assembly of 19 wherein the sample product is instant coffee.
21. The package assembly of 18 wherein the sample product comprises at least one of a crayon, a measuring tape, a small tool, cosmetic product, and candy.
22. The package assembly of 18 wherein the card holder comprises a panel and an opening.
23. The package assembly of 22 wherein the transaction cards and sample are releasably attached to the cardholder.
24. The package assembly of 23 wherein the sample or another sample may be attached or reattached to the card holder.
25. The package assembly of 18 wherein the card holder is in the style of an envelope or pocket.
26. The package assembly of 25 wherein the transaction cards and sample are enclosed within the card holder.
27. The package assembly of 18 wherein the card holder comprises a panel and an outer layer for retaining the transaction cards and sample without the transaction cards or sample being attached to the cardholder.
28. The package assembly of 27 wherein the outer layer is a transparent plastic layer or film.
29. The package assembly of 18 wherein the transaction cards are packaged so that they can be activated in a one-step activation process.
30. The package assembly of 18 wherein the transaction cards are packaged so that they can be activated in a two-step activation process
31. The package assembly of 18 wherein the package assembly comprises one or more encoded identifiers.
32. The package assembly of 31 wherein the one or more encoded identifiers are located on the transaction cards, on the cardholder or both.
33. The package assembly of 31 wherein the encoded identifiers are one or more of a vendor product identification code, an issuer accounts code, a combination vendor product identification and issuer account code, or any combination thereof
34. The package assembly of 18 wherein the sample comprises one or more encoded identifiers.

35. A method for providing a sample product with a purchase of a transaction card comprising:
providing a transaction card package assembly having a releasably attached first sample product;
removing the releasably attached first sample product from the transaction card package assembly; and
replacing the releasably attached first sample product with a releasably attached second sample product.

36. The method of 35 wherein the transaction card package assembly comprises a card holder and one or more transaction cards.

37. The method of 36 wherein the transaction card package assembly and the second sample product each comprise one or more encoded identifiers.

38. The method of 37 wherein at least one of the one or more encoded identifiers comprised by the transaction card package assembly is an issuer account code.

39. The method of 37 wherein at least one of the one or more encoded identifiers comprised by the transaction card package assembly is a combination vendor product identification and issuer account code.

40. The method of 37 further comprising sending a correlation request to a transaction card package assembly processing computer.

41. The method of 40 wherein the correlation request comprises at least one of identification of the transaction card package assembly, identification of the second sample product, identification of the point of sale terminal, location of the point of sale terminal, time of the correlation request, date of the correlation request, identification of the transaction card package assembly issuer, identification of the sample issuer or any combination thereof 42. A transaction card package assembly processing system comprising:
a datastore maintaining account information for a plurality of transaction card package assemblies, a plurality of samples, and any correlations between the two;
a point of sale terminal interface for receiving and transmitting a message and response with a point of sale terminal;
a sample correlation unit to process and record correlation instruction, to determine whether a transaction card package assembly and sample are eligible for correlation, and to correlate one or more sample identifications with one or more transaction card package assembly identifications;
a data request unit for processing data requests received from and transmitting data request responses to a transaction card package assembly interested party;
a card issuer authorization system interface for receiving and transmitting a message and response with a card issuer authorization system;
a sample issuer system interface for receiving and transmitting a message and response with a sample issuer system; and
a merchant system interface for receiving and transmitting a message and response with a merchant system.

43. The transaction card package assembly processing system of 42 wherein the message comprises an activation request.

44. The transaction card package assembly processing system of 42 wherein the message comprises a correlation request.

45. The transaction card package assembly processing system of 42 wherein the message comprises correlation instruction.

46. The transaction card package assembly processing system of 42 wherein the message comprises a data request.

47. The transaction card package assembly processing system of 42 wherein the message comprises a redemption request 48. The transaction card package assembly processing system of 42 wherein the transaction card package assembly interested party comprises one of a transaction card package assembly vendor, a transaction card package assembly merchant, a transaction card package assembly issuer, or a transaction card package assembly processing system administrator.

49. The transaction card package assembly processing system of 42 further comprising a transaction log for recording transaction data.

50. The computer implemented method of 42 further comprising recording transaction data in an error log if the transaction is denied.

51. The transaction card package assembly processing system of 42 further comprising a reconciliation unit for reconciling accounts of transaction card package assembly interested parties.

52. The transaction card package assembly processing system of 51 wherein the transaction card package assembly interested parties comprise transaction card package assembly vendors, transaction card package assembly merchants, transaction card package assembly issuers, a transaction card package assembly processing system administrator and combinations thereof.

53. The transaction card package assembly processing system of 42 further comprising a unit for allocating, when present, an activation amount or a redemption amount.

54. A computer implemented method for conducting a transaction card package assembly transaction comprising:
receiving in a transaction card package assembly processing computer correlation instruction from a transaction card package assembly interested party for at least one transaction card package assembly and at least one sample, wherein the correlation instruction comprises at least one transaction card package assembly identification and at least one sample identification;
identifying accounts in a datastore associated with the at least one transaction card package assembly identification and the at least one sample identification; and
updating the associated accounts in the datastore to reflect the correlation instruction.

55. The computer implemented method of 54 wherein the transaction card package assembly interested party comprises one of a transaction card package assembly issuer or a sample issuer.

56. The computer implemented method of 54 wherein the transaction card package assembly comprises one or more transaction cards, a card holder, and one or more samples.

57. The computer implemented method of 54 wherein the correlation instruction further comprises at least one of an authorization for the at least one sample to be correlated with the at least one transaction card package assembly, a date the correlation becomes eligible, a date the correlation becomes ineligible, identification of one or more vendor locations wherein the correlation is eligible, and any combination thereof.

58. A computer implemented method for conducting a transaction card package assembly transaction comprising:
   receiving in a transaction card package assembly processing computer correlation instruction from a transaction card package assembly interested party for at least one transaction card package assembly and at least one sample, wherein the correlation instruction comprises at least one individual transaction card identification and at least one sample identification;
   identifying accounts in a datastore associated with the at least one transaction card identification and the at least one sample identification; and
   updating the associated accounts in the datastore to reflect the correlation instruction.

59. The computer implemented method of 58 wherein the transaction card package assembly interested party comprises one of a transaction card package assembly issuer or a sample issuer.

60. The computer implemented method of 58 wherein the at least one individual transaction card is comprised by a transaction card package assembly.

61. The computer implemented method of 60 wherein the transaction card package assembly comprises one or more transaction cards, a card holder, and one or more samples.

62. The computer implemented method of 58 wherein the correlation instruction further comprises at least one of an authorization for the at least one sample to be correlated with the at least one individual transaction card, a date the correlation becomes eligible, a date the correlation becomes ineligible, identification of one or more vendor locations wherein the correlation is eligible, and any combination thereof.

63. A computer implemented method for conducting a transaction card package assembly transaction comprising:
   receiving in a transaction card processing computer a correlation request from a transaction card package assembly interested party for a transaction card package assembly and a sample, wherein the correlation request comprises a transaction card package assembly identification and a sample identification;
   comparing the transaction card package assembly identification and the sample identification to stored data in a datastore to determine if the transaction card package assembly and the sample are eligible for correlation;
   correlating the sample identification with the transaction card package assembly identification when the transaction card package assembly and the sample are found eligible for correlation;
   updating the transaction card package assembly account and the sample account in the datastore to reflect correlation; and
   transmitting a correlation completion message to the transaction card package assembly interested party.

64. The computer implemented method of 63 wherein the correlation request further comprises at least one of time of the correlation request, date of the correlation request, identification of the transaction card package assembly issuer and identification of the sample issuer.

65. The computer implemented method of 63 wherein the correlation request is received from a point of sale terminal.

66. The computer implemented method of 65 wherein the correlation request further comprises at least one of identification of the point of sale terminal, location of the point of sale terminal, time of the correlation request, date of the correlation request, identification of the transaction card package assembly issuer, and identification of the sample issuer.

67. The computer implemented method of 63 wherein the correlation request is received from a transaction card package assembly interested party system.

68. The computer implemented method of 67 wherein the correlation request further comprises at least one of identification of the transaction card package assembly interested party system, location of the transaction card package assembly interested party system, time of the correlation request, date of the correlation request, identification of the transaction card package assembly issuer and identification of the sample issuer.

69. The computer implemented method of 63 wherein the transaction card package assembly interested party comprises one of a transaction card package assembly issuer, a sample issuer, or a transaction card package assembly vendor.

70. A computer implemented method for conducting a transaction card package assembly transaction comprising:
   receiving in a transaction card processing computer a correlation request from a transaction card package assembly interested party for a transaction card package assembly and a sample, wherein the correlation request comprises an individual transaction card identification and a sample identification;
   comparing the transaction card identification and the sample identification to stored data in a datastore to determine if the transaction card and the sample are eligible for correlation;
   correlating the sample identification with the transaction card identification when the transaction card and the sample are found eligible for correlation;
   updating the transaction card account and the sample account in the datastore to reflect correlation; and
   transmitting a correlation completion message to the transaction card package assembly interested party.

71. The computer implemented method of 70 wherein the individual transaction card is comprised by a transaction card package assembly.

72. The computer implemented method of 70 wherein the correlation request further comprises at least one of time of the correlation request, date of the correlation request, identification of the transaction card package assembly issuer and identification of the sample issuer.

73. The computer implemented method of 70 wherein the correlation request is received from a point of sale terminal.

74. The computer implemented method of 73 wherein the correlation request further comprises at least one of identification of the point of sale terminal, location of the point of sale terminal, time of the correlation request, date of the correlation request, identification of the transaction card package assembly issuer, and identification of the sample issuer.

75. The computer implemented method of 70 wherein the correlation request is received from a transaction card package assembly interested party system.

76. The computer implemented method of 75 wherein the correlation request further comprises at least one of identification of the transaction card package assembly interested party system, location of the transaction card package assembly interested party system, time of the correlation request, date of the correlation request, identification of the transaction card package assembly issuer and identification of the sample issuer.

77. The computer implemented method of 70 wherein the transaction card package assembly interested party comprises one of a transaction card package assembly issuer, a sample issuer, or a transaction card package assembly vendor.

78. A computer implemented method for conducting a transaction card package assembly transaction comprising:
receiving in a transaction card package assembly processing computer a transaction request for a transaction card package assembly from a point of sale terminal, wherein the transaction request comprises at least one of a transaction card package assembly identification, a point of sale terminal identification, a vendor identification, a merchant identification, and a transaction card package assembly issuer identification;
transmitting the transaction request to a transaction card package assembly issuer authorization system;
receiving a response from the transaction card package assembly issuer authorization system;
transmitting the response to the point of sale terminal; and
updating the datastore to reflect a completed transaction of the transaction card package assembly.

79. The computer implemented method of 78 wherein the transaction request comprises a correlation request.

80. The computer implemented method of 78 wherein the transaction request comprises an activation request.

87. The computer implemented method of 78 wherein the transaction request comprises a redemption request.

82. The computer implemented method of 78 wherein the transaction request comprises a deactivation request 83. The computer implemented method of 78 wherein the transaction card package assembly comprises one transaction card, a card holder and at least one sample.

84. The computer implemented method of 78 wherein the transaction card package assembly comprises multiple transaction cards, a card holder and at least one sample.

85. The computer implemented method of 78 further comprising recording transaction data in a transaction log.

86. The computer implemented method of 78 further comprising recording transaction data in an error log if the transaction is denied.

87. The computer implemented method of 78 further comprising reconciling accounts of transaction card package assembly interested parties.

88. The computer implemented method of 87 wherein the transaction card package assembly interested parties comprise transaction card package assembly vendors, transaction card package assembly merchants, transaction card package assembly issuers, a transaction card package assembly processing system administrator and combinations thereof.

89. A method for determining the efficacy of inclusion of a sample product with a sale of a transaction card comprising:
providing a first transaction card package assembly, wherein the first transaction card package assembly comprises at least one transaction card and at least one sample;
providing a second transaction card package assembly, wherein the second transaction card package assembly comprises at least one transaction card and does not comprise the at least one sample of the first transaction card package assembly;
comparing sales of the first transaction card package assembly to sales of the second transaction card package assembly.

90. A method for determining the efficacy of inclusion of a sample with a sale of a transaction card comprising:
tracking the sale of a commercially available product and/or service for a predetermined span of time, wherein a transaction card package assembly comprising a sample associated with the commercially available product and/or service is not available for purchase;
tracking the sale of the commercially available product and/or service for a second subsequent predetermined span of time, wherein a transaction card package assembly comprising a sample associated with the commercially available product and/or service is available for purchase;
comparing sales of the commercially available product and/or service during the first predetermined span of time and sales of the commercially available product and/or service during the second predetermined span of time.

91. The method of 90 wherein the second predetermined span of time is equal to the first predetermined span of time.

92. A computer implemented method for providing transaction card package assembly transaction data comprising:
receiving in a transaction card package assembly processing computer a data request from a transaction card package assembly interested party, wherein the data request comprises a request for data stored in the transaction card package assembly processing computer;
identifying the data requested in the data request;
retrieving the data requested;
forwarding the data requested as a message to the transaction card package assembly interested party.

93. The computer implemented method of 92 wherein the transaction card package assembly interested party comprises one of a transaction card package assembly issuer, a sample issuer, a transaction card package assembly vendor, a transaction card package assembly merchant or a transaction card package assembly processing computer administrator.

94. The computer implemented method of 92 wherein the data requested comprises at least one of identification of samples correlated to specific transaction card package assemblies, identification of entity requesting correlation of specific samples to specific transaction card package assemblies, location of entity requesting correlation of specific sample to specific transaction card package assemblies, time and date of correlation request for specific samples to specific transaction card package assemblies, activation of specific transaction card package assemblies with correlated samples, activation of specific transaction card package assemblies without correlated samples, identification of vendors activating specific transaction card package assemblies, location of vendors activating specific transaction card package assemblies, time and date of activation of specific transaction card package assemblies, redemption of specific transaction cards, redemption of transaction cards from specific transaction card package assemblies with correlated samples, redemption of transaction cards from specific transaction card package assemblies without correlated samples, identification of vendors redeeming specific transaction cards, location of vendors redeeming specific transaction cards, time and date of redemption of specific transaction cards, or any combination thereof.

While preferred embodiments of the invention have been shown and described herein, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Package assembly embodiments as described herein may be manufactured according to various methods known in the art. For example, transaction cards can be manufactured and printed and subsequently placed in a printed card holder, or alternatively the transaction card and card holder can be made concurrently, for example via coextrusion of a plastic sheet with subsequent printing. Alternative methods of making the various embodiments disclosed herein will be apparent to those skilled in the art.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A transaction card package assembly processing system comprising:
    a plurality of transaction card package assemblies, wherein the plurality of transaction card package assemblies comprises at least a first transaction card package assembly and a second transaction card package assembly and wherein the first transaction card package assembly is different from the second transaction card package assembly;
    a plurality of samples, wherein the plurality of samples comprises at least a first sample and a second sample, wherein the first sample is different from the second sample, and wherein the first sample is releasably attachable and re-attachable to the first transaction card assembly and the second transaction card package assembly and the second sample is releasably attachable and re-attachable to the first transaction card package assembly and the second transaction card package assembly;
    a datastore maintaining account information for the plurality of transaction card package assemblies, the plurality of samples, and any correlations between the two;
    a point of sale terminal interface for communicating with a point of sale terminal;
    a sample correlation unit to process and record correlation instructions, to determine which of the first transaction card package assembly and the second transaction card package assembly are eligible for correlation with the first sample and the second sample at a time of purchase of at least one of the first transaction card package assembly and the second transaction card package assembly, and to correlate one or more sample identifications with one or more transaction card package assembly identifications, wherein the sample correlation unit is a microprocessor comprising part of a distributed computing system for the transaction card package assembly processing system;
    a data request unit for processing data requests received from and transmitting data request responses to a transaction card package assembly interested party, wherein the data request unit is also part of the distributed computing system for the transaction card package assembly processing system;
    a card issuer authorization system interface for communicating with a card issuer authorization system;
    a sample issuer system interface for communicating with a sample issuer system; and
    a merchant system interface for communicating with a merchant system.

2. The transaction card package assembly processing system of claim 1 wherein communicating comprises an activation request.

3. The transaction card package assembly processing system of claim 1 wherein communicating comprises a correlation request.

4. The transaction card package assembly processing system of claim 1 wherein communicating comprises correlation instruction.

5. The transaction card package assembly processing system of claim 1 wherein communicating comprises a data request.

6. The transaction card package assembly processing system of claim 1 wherein communicating comprises a redemption request.

7. The transaction card package assembly processing system of claim 2 wherein communicating comprises a correlation request.

8. The transaction card package assembly processing system of claim 2 wherein communicating comprises correlation instruction.

9. The transaction card package assembly processing system of claim 2 wherein communicating comprises a data request.

10. The transaction card package assembly processing system of claim 2 wherein communicating comprises a redemption request.

11. The transaction card package assembly processing system of claim 7 wherein communicating comprises correlation instruction.

12. The transaction card package assembly processing system of claim 7 wherein communicating comprises a data request.

13. The transaction card package assembly processing system of claim 7 wherein communicating comprises a redemption request.

14. The transaction card package assembly processing system of claim 11 wherein communicating comprises a data request.

15. The transaction card package assembly processing system of claim 11 wherein communicating comprises a redemption request.

16. The transaction card package assembly processing system of claim 14 wherein communicating comprises a redemption request.

* * * * *